US010969517B2

(12) United States Patent
Jachmann et al.

(10) Patent No.: US 10,969,517 B2
(45) Date of Patent: Apr. 6, 2021

(54) REVERSE CIRCULAR POLARIZATION BASED ANTENNA ORIENTATION

(71) Applicant: Halliburton Energy Services, Inc., Houston, TX (US)

(72) Inventors: Rebecca Corina Jachmann, Spring, TX (US); Yunzhao Xing, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1 day.

(21) Appl. No.: 16/798,396

(22) Filed: Feb. 23, 2020

(65) Prior Publication Data

US 2020/0319372 A1 Oct. 8, 2020

Related U.S. Application Data

(63) Continuation of application No. PCT/US2019/026104, filed on Apr. 5, 2019.

(51) Int. Cl.
*G01V 13/00* (2006.01)
*G01V 3/32* (2006.01)

(52) U.S. Cl.
CPC ............... *G01V 13/00* (2013.01); *G01V 3/32* (2013.01)

(58) Field of Classification Search
CPC .................................. G01V 13/00; G01V 3/32
USPC .......................................................... 324/303
See application file for complete search history.

(56) References Cited

U.S. PATENT DOCUMENTS

| 4,707,664 | A | * | 11/1987 | Fehn ................ G01R 33/34046 324/307 |
|---|---|---|---|---|
| 6,781,371 | B2 | | 8/2004 | Taherian et al. |
| 7,193,414 | B2 | | 3/2007 | Kruspe et al. |
| 7,649,353 | B2 | | 1/2010 | Feiweier et al. |
| 7,714,581 | B2 | | 5/2010 | Erickson et al. |
| 8,294,461 | B2 | | 10/2012 | Overall et al. |
| 8,319,496 | B2 | | 11/2012 | Eryaman et al. |
| 8,466,683 | B2 | | 6/2013 | Legendre et al. |
| 8,674,695 | B2 | * | 3/2014 | Wiggins ........... G01R 33/34046 324/309 |
| 9,201,159 | B2 | | 12/2015 | Morys et al. |
| 9,377,557 | B2 | | 6/2016 | Reiderman |
| 9,632,204 | B2 | | 4/2017 | Jachmann et al. |

(Continued)

FOREIGN PATENT DOCUMENTS

| EP | 0455418 A2 | 11/1991 |
|---|---|---|
| EP | 0967490 A1 | 12/1999 |
| WO | 2016164441 A1 | 10/2016 |

OTHER PUBLICATIONS

Hammer; "MRI Physics: Pulse Sequences"; Pub. Date 2014; http://xrayphysics.com/sequences.html; 8-10 (Year: 2014).*
Vaidya et al.; "Dependence of B1+ and B1- Field Patterns of Surface Coils on the Electrical Properties of the Sample and the MR Operating Frequency"; Pub. Date Oct. 27, 2016; Concepts Magn Reson Part B Magn Reson Eng. (Year: 2016).*

(Continued)

*Primary Examiner* — Melissa J Koval
*Assistant Examiner* — Rahul Maini
(74) *Attorney, Agent, or Firm* — Gilliam IP PLLC

(57) ABSTRACT

RCP pulses are used to calibrate an NMR logging tool with a quadrature antenna. Using a number of RCP pulses provides NMR signals that can be used to find optimal positioning for antennas on the quadrature antenna. Optimally positioning antennas provides accurate values for NMR signal measurements. Employing an optimally positioned quadrature antenna readily enables the NMR logging tool to produce CP pulses and RCP pulses.

20 Claims, 14 Drawing Sheets

(56) References Cited

U.S. PATENT DOCUMENTS

| | | |
|---|---|---|
| 9,562,989 B2 | 5/2017 | Conrad et al. |
| 9,658,358 B2 | 5/2017 | Hürlimann et al. |
| 2003/0052677 A1 | 3/2003 | Pines et al. |
| 2004/0066192 A1 | 4/2004 | Heidler |
| 2010/0253338 A1 | 10/2010 | Eryaman et al. |
| 2012/0212074 A1* | 8/2012 | Uchida .................. H02J 7/025 307/104 |
| 2013/0234704 A1 | 9/2013 | Hurlimann et al. |
| 2015/0061665 A1 | 3/2015 | Reiderman et al. |
| 2015/0323698 A1 | 11/2015 | Mandal et al. |
| 2016/0266272 A1 | 9/2016 | Jachmann et al. |
| 2017/0254919 A1 | 9/2017 | Coman et al. |
| 2018/0003852 A1 | 1/2018 | Jachmann et al. |

OTHER PUBLICATIONS

PCT Application Serial No. PCT/US2019/026104, International Search Report, dated Jan. 3, 2020, 3 pages.

PCT Application Serial No. PCT/US2019/026104, International Written Opinion, dated Jan. 3, 2020, 7 pages.

PCT Application Serial No. PCT/US2019/026109, International Search Report, dated Jan. 3, 2020, 4 pages.

PCT Application Serial No. PCT/US2019/026109, International Written Opinion, dated Jan. 3, 2020, 7 pages.

Blanz, et al., "Nuclear Magnetic Resonance Logging While Drilling (NMR-LWD): From an Experiment to a Day-to-Day Service for the Oil Industry", diffusion-fundamentals.org 14 (2010) 2, pp. 1-5.

Freude, "Nuclear Magnetic Resonance", Spectroscopy, Nov. 2006, 29 pages.

\* cited by examiner

REVERSE CIRCULAR POLARIZATION BASED ANTENNA ORIENTATION

TECHNICAL FIELD

The disclosure generally relates to the field of logging.

BACKGROUND ART

Nuclear magnetic resonance (NMR) logging allows the detection of liquids and fluids downhole. This includes hydrogen, whose presence is linked to hydrocarbons. Different antennas may be used to produce NMR signals.

BRIEF DESCRIPTION OF THE DRAWINGS

Embodiments of the disclosure may be better understood by referencing the accompanying drawings.

DESCRIPTION OF EMBODIMENTS

Figure 1:
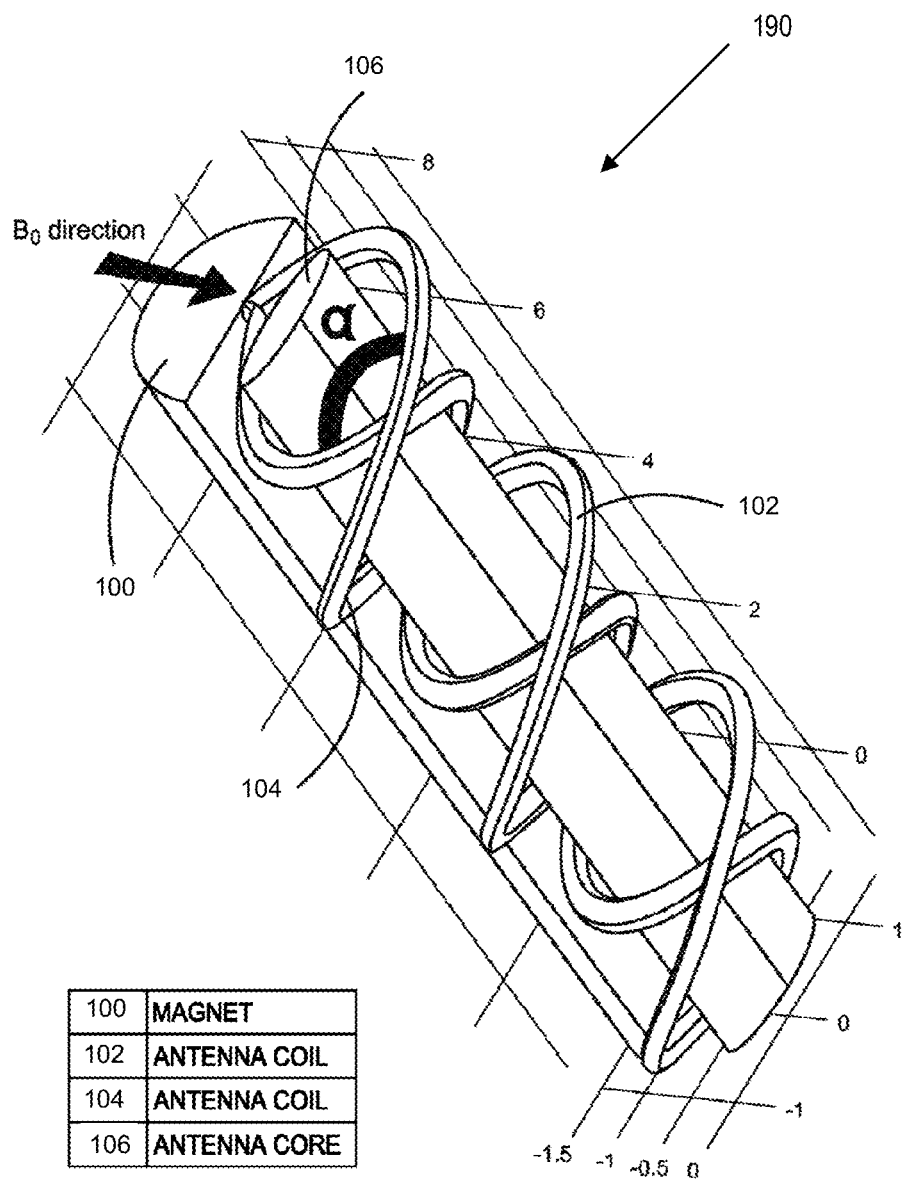
FIG. 1 illustrates an example configuration of antenna windings, magnet, and core that may be employed in an NMR logging tool, according to some embodiments.

The description that follows includes example systems, methods, techniques, and program flows that embody embodiments of the disclosure. However, it is understood that this disclosure may be practiced without these specific details. For instance, this disclosure refers to quadrature antennas in illustrative examples. Embodiments of this disclosure can be also applied to other antennas capable of producing CP pulses and RCP pulses. In other instances, well-known instruction instances, protocols, structures and techniques have not been shown in detail in order not to obfuscate the description.

Overview

In order to utilize circular polarization (CP) for downhole tool measurements, quadrature antennas with multiple coils can be utilized for transmit/receive (T/R) systems. The status of quadrature antennas, such as coupling status, affect measurement results significantly. In ideal conditions, an RCP pulse will not influence formation substances, and therefore will not excite any NMR signals. In this case, no losses are created from cross talk. However, if the antennas are not in a perfect perpendicular position, the RCP pulse will cause excitation of formation substances and an NMR signal can be excited. Therefore, positioning quadrature antennas in a fast and reliable manner aids in downhole measuring and accounts for the environment and reduced likelihood "perfect perpendicular" positions.

Using RCP pulses, the imperfect coupling status of antennas can be quantified and corrected. Using RCP pulses is convenient because it is more obvious to see a signal level appear than to find a maximal signal (as would be the case if using CP pulses). Additionally, using CP pulses may involve effects such as mixed resonance frequency, which in turn affects NMR signals when the two coils are perpendicular. For these reasons, RCP pulses can be used to determine when cross talk is at a minimum in quadrature antennas and used in positioning the two antennas to minimize cross talk. One method for minimizing cross talk is to systematically shift one coil's orientation with respect to the other's and acquire NMR signals from RCP pulses at each relative position of the two antennas until a position is found that yields a minimum NMR signal or an NMR signal which is lower than a particular threshold. RCP pulses may correspond to CPMG echo trains, a single Hahn echo, or an FID signal.

The relative positions of each antenna can be tested by measuring either an angle or a distance between a specific point on each antenna, such as the surface distance between the two points. A reliable method of measuring the positions of each antenna on the tool may comprise a compass, physical marks, or a laser instrument which tracks the positions of each antenna. The method by which the angles are measured, however, are not limited to these. The relative position of the two antennas can be changed in a linear or non-linear manner. The results can either be fitted to find the exact position that minimizes cross talk between the antennas, or the best rotation tested can be used.

Example Quadrature Antennas

Figure 2:
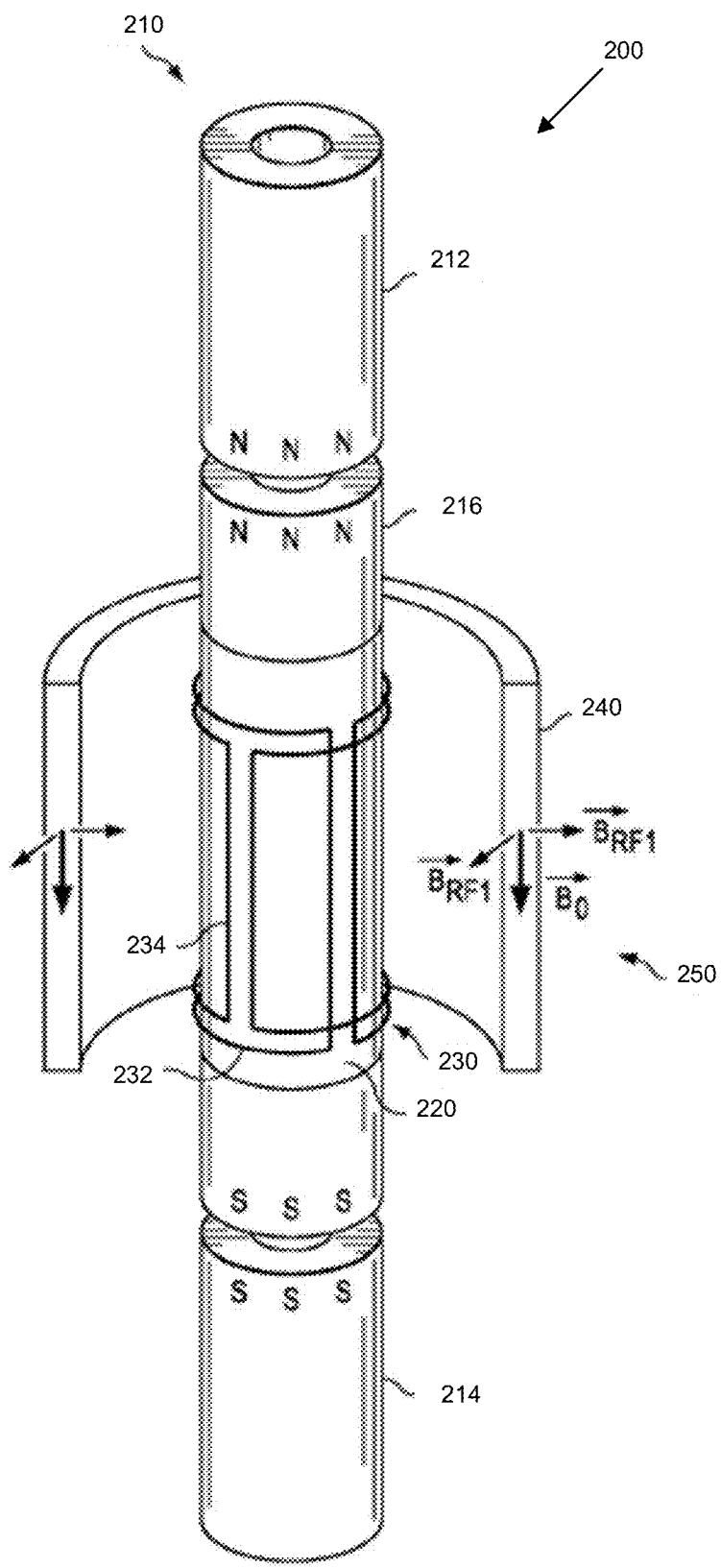
FIG. 2 depicts an NMR logging tool with an example quadrature antenna having a magnet assembly, according to some embodiments.

FIGS. 1 and 2 depict two different example quadrature antennas. FIG. 1 illustrates an example configuration of antenna windings, magnet, and core that may be employed in an NMR logging tool, according to some embodiments. An NMR logging tool 190 includes an elongated permanent magnet 100. The magnet 100 has a generally semi-circular outline in cross section but in other examples can have another suitable cross-sectional shape. In use, the magnet 100 generates a "main magnetic field" or "static field" $B_0$ in the direction generally indicated by the arrow $B_0$ in the view. This direction is substantially perpendicular to the longitudinal axis of the magnet 100 and will typically lie in the direction of the intended measurements to be taken by the NMR tool 190. The longitudinal axis of the magnet 100 may align with or be parallel to the longitudinal axis of the NMR logging tool 190 in which the magnet 100 is placed.

Positioned adjacent the magnet 100 are first and second antenna coils 102 and 104 wrapped around a common antenna core 106. Other configurations of antenna core are possible. The turns of the antenna coils 102 and 104 lie neither in the plane of the tool axis or the tool cross section. Further, the turns of the first and second antenna coils 102 and 104 are unaligned with either a longitudinal axis of the tool or an orthogonal axis substantially transverse thereto. In contradistinction, in conventional tools, the longitudinal axis of a conventional antenna coil is aligned either with the longitudinal axis of the tool in which the coil is fitted, or orthogonal to the longitudinal axis (a transverse axis). The turns of conventional antenna coils are, therefore, substantially in alignment with the longitudinal or transverse axis or in alignment with planes extending in the directions of these axes. It may be argued that the turns of conventional coils are slightly out of alignment with the main axes (or planes in these directions) by dint of the helical or spiral configuration of the conventional coils. However, this misalignment is not appreciable and the effect of separating the turns of the antenna coils by an optimum angle to achieve advantages of some embodiments has not been appreciated.

In some embodiments, the turns in one antenna coil may be separated from corresponding turns in the second oppositely wound antenna coil by an angle α. This angle of separation may exist between turns of overlapping coils or turns of separate coils. Thus, instead of the insignificant or unrecognized misalignment of coil turns of conventional NMR tools, the angle α may, in some embodiments, be in the range of 20° to 160°, or 70° to 110°. In some embodiments, the angle (α) of separation exceeds 90° degrees. The angle α may be used to define an imperfection angle θ by the relationship α=90°−θ.

In some embodiments, the first and second antenna coils 102 and 104 have a common longitudinal axis and are wound around a common antenna core, such as the core 106. The first antenna coil 102 includes a spirally wound coil configuration around the common antenna core 106, and the second antenna coil 104 may include an oppositely wound spiral configuration around the common antenna core 106. The spiral coil configurations may be generally as shown in FIG. 1, but other coil configurations are possible. Example dimensions of the antenna windings, magnet, and core configuration are given by the illustrated dimension grid. For example, the overall length of the configuration may be approximately eight inches, the width approximately two inches, and the depth (in the view) approximately one and a half inches.

In use, the first antenna coil 102 may be energized by radio frequency power having a 90-degree phase difference from radio frequency power energizing the second antenna coil 104, such that the NMR logging tool 190 generates a circularly polarized RF magnetic field.

FIG. 2 depicts an NMR logging tool with an example quadrature antenna having a magnet assembly, according to some embodiments. FIG. 2 depicts an NMR logging tool 200. The NMR logging tool 200 includes a magnet assembly that generates a static magnetic field to produce polarization, and an antenna assembly that (a) generates a radio frequency (RF) magnetic field to generate excitation, and (b) acquires NMR signals. In the example shown in FIG. 1, the magnet assembly that includes the end piece magnets 212, 214 and a central magnet 216 generates the static magnetic field in the volume of investigation 240. In the volume of investigation 240, the direction of the static magnetic field (shown as the solid black arrow 250) is parallel to the longitudinal axis of the wellbore. In some examples, a magnet configuration with double pole strength can be used to increase the strength of the magnetic field (e.g., up to 100-150 Gauss or higher in some instances). In the example shown in FIG. 2, the antenna assembly 230 includes two mutually orthogonal transversal-dipole antennas 232, 234. The example transversal-dipole antennas 232, 234 shown in FIG. 2 are placed on an outer surface of a soft magnetic core 220, which is used for RF magnetic flux concentration. The static magnetic field can be axially symmetric (or substantially axially symmetric), and therefore may not require broader band excitation associated with additional energy loss. The volume of investigation can be made axially long enough and thick enough (e.g., 20 cm long, and 0.5 cm thick in some environments) to provide immunity or otherwise decrease sensitivity to axial motion, lateral motion, or both. A longer sensitivity region can enable measurement while tripping the drill string. The sensitivity region can be shaped by shaping the magnets 212, 214, 216 and the soft magnetic material of the core 220. In some implementations, the antenna assembly 230 additionally or alternatively includes an integrated coil set that performs the operations of the two transversal-dipole antennas 232, 234. For example, the integrated coil may be used (e.g., instead of the two transversal-dipole antennas 232, 234) to produce circular polarization and perform quadrature coil detection. Examples of integrated coil sets that can be adapted to perform such operations include multi-coil or complex single-coil arrangements, such as, for example, birdcage coils commonly used for high-field magnetic resonance imaging (MRI). Compared to some example axially-symmetrical designs, the use of the longitudinal-dipole magnet and the transversal dipole antenna assembly also has an advantage of less eddy current losses in the formation and drilling fluid (i.e., "mud") in the wellbore due to a longer eddy current path than for some longitudinal-dipole antenna(s). In some embodiments, NMR measurements over multiple subvolumes can increase the data density and therefore signal-to-noise ratio ("SNR") per unit time. Multiple volume measurements in a static magnetic field having a radial gradient can be achieved, for example, by acquiring NMR data on a second frequency while waiting for nuclear magnetization to recover (e.g., after a CPMG pulse train) on a first frequency. A number of different frequencies can be used to run a multi-frequency NMR acquisition involving a number of excitation volumes with a different depth of investigation. In addition to higher SNR, the multi-frequency measurements can also enable profiling the fluid invasion in the wellbore, enabling a better assessment of permeability of earth formations. Another way to conduct multi-volume measurements is to use different regions of the magnet assembly to acquire an NMR signal. NMR measurements of these different regions can be run at the same time (e.g., simultaneously) or at different times.

Example Illustrations

Figure 3:
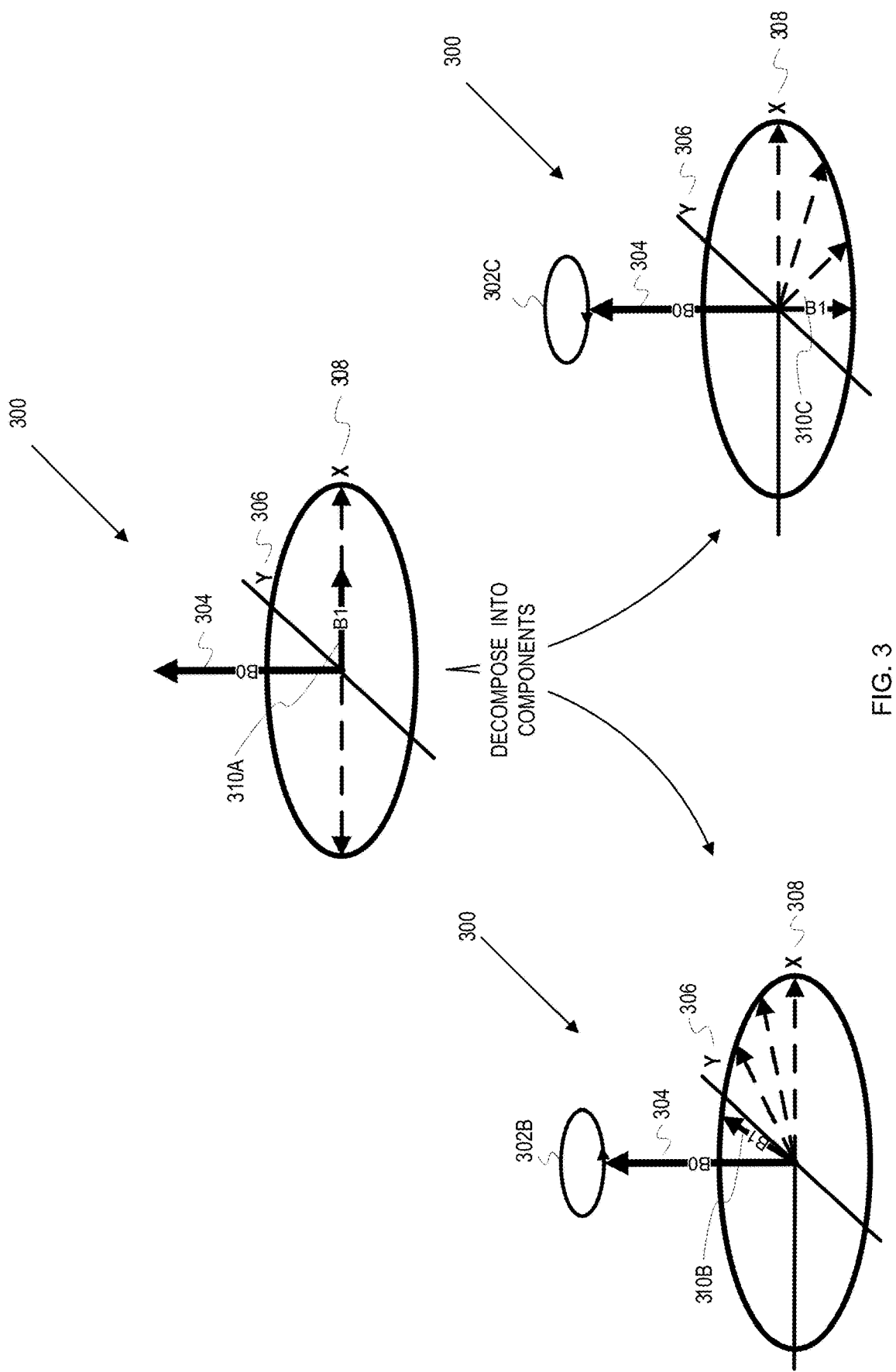
FIG. 3 depicts a constant static magnetic field, a linear polarized oscillating magnetic field during a singular antenna pulse, and two counter rotating magnetic fields the linear polarized oscillating magnetic field mathematically decomposes into.

FIG. 3 depicts a constant static magnetic field, a linear polarized oscillating magnetic field during a singular antenna pulse, and two counter rotating magnetic fields mathematically decomposed from the linear polarized oscillating magnetic field. FIG. 3 depicts the fluctuation of magnetic fields in response to a pulse. A pulse is a time limited event used in modern NMR techniques. A pulse is a single vibration or short burst of sound, electric current, light, or another wave. Magnetic fields are created during a portion of time in which the pulse occurs. FIG. 3 depicts a reference frame 300. The reference frame 300 has a y-axis 306 and an x-axis 308. FIG. 3 depicts the perpendicular components of a linearly polarized oscillating magnetic field ($B_1$) 310A created by the pulse from the antenna at the static magnetic field ($B_0$) 304. The x- and y-plane is determined by the static magnetic field ($B_0$) 304, which is defined to be the z-axis. The x- and y-axes are determined in the case shown for the x-axis to be aligned with the perpendicular portion of the oscillating magnetic field herein called B1 field and the y-axis to be perpendicular to both x-axis and z-axis. The linearly polarized oscillating magnetic field 310A can be decomposed into two counter rotating magnetic fields, 310B and 310C. The axis of rotation is determined by the static magnetic field. The rotating magnetic fields 310B-C are the components of the linearly polarized oscillating magnetic field ($B_1$) 310A that are perpendicular to the static magnetic field ($B_0$) 304 along the axes 308 and 306. The direction of rotation for 310B-C is shown by arrow 302B and 302C with an angular velocity equal to a Larmor frequency. The Larmor frequency is given by Equation (1):

$$\omega_0 = -\gamma B_0 \quad (1)$$

where $\gamma$ is the gyromagnetic ratio of a substance and $B_0$ is the static magnetic field magnitude. The static magnetic field 304 is produced by a permanent magnet for NMR logging tools. The gyromagnetic ratio $\gamma$ is known for different nuclei and atoms, including hydrogen and various other ions which are the primary subjects of NMR logging.

The varying magnetic field ($B_1$) 310A is depicted orthogonal to the y-axis 306 and parallel to the x-axis 308. The varying magnetic field 310A (along the dashed line) oscillates between positive and negative values of the x-axis 308 and has zero angular velocity in the x-y plane. The varying magnetic field 310A is equivalent to the sum of two rotating components 310B and 310C. Both components rotate in the x-y plane, at the same frequency, but in opposite directions. The varying magnetic fields 310B, 310C oscillate in both the x-axis 308 and the y-axis 306.

A component rotating in the same direction as the spin precession is the resonant component. A component rotating opposite to the spin precession is the non-resonant component. Varying magnetic field 310B represents the resonant component of varying magnetic field 310A while varying magnetic field 310C represents the non-resonant component. The varying magnetic field 310A precesses at the Larmor frequency. The varying magnetic field 310A oscillates along the x-axis 308 with an amplitude $2b_1$. This may be rewritten as a superposition of two waves oscillating clockwise and counterclockwise about the z-axis as depicted by the varying magnetic field 310C and the varying magnetic field 310B, respectively. The linearly polarized oscillating magnetic field is given by Equation (2):

$$B_{rf_{linear}}(t) = \quad (2)$$
$$2|b_1|\cos(\omega_{ref}t + \varphi_p)e_x = |b_1|(\cos(\omega_{ref}t + \varphi_p)e_x + \sin(\omega_{ref}t + \varphi_p)e_y +$$
$$\cos(\omega_{ref}t + \varphi_p)e_x - \sin(\omega_{ref}t + \varphi_p)e_y)$$

Under ordinary circumstances, the non-resonant component 310B has almost no influence on the motion of the spins while the resonant component 310C has strong interaction with the spins. The non-resonant component influence is on the order of $(B_1/2B_0)^2$, which is known as the Bloch-Siegert shift. A resonant component (as depicted by the varying field 310C) of the varying magnetic field is given by Equation (3):

$$B_{rf,resonant}(t) = b_1\cos(\omega_{ref}t + \varphi_p)e_x + b_1\sin(\omega_{ref}t + \varphi_p)e_y \quad (3)$$

A non-resonant component (as depicted by the varying field 310B) is given by Equation (4):

$$B_{rf,non-resonant}(t) = b_1\cos(\omega_{ref}t + \varphi_p)e_x - b_1\sin(\omega_{ref}t + \varphi_p)e_y \quad (4)$$

$B_{1,resonant}$ and $B_{1,non-resonant}$ are the varying magnetic fields 310C and 310B, respectively. $b_1$ is the amplitude of $B_{1,resonant}$ and $B_{1,non-resonant}$, $\omega_{ref}$ is the angular frequency of the reference frame (e.g., the rotation 302), and $\varphi_p$ is the initial phase of the varying magnetic fields 310B and 310C. The varying magnetic field 310A can be expressed as a sum of the varying magnetic fields 310B and 310C. Similarly, CP and RCP pulses can create the clockwise and counterclockwise rotating fields as demonstrated from the linear pulses, however, for a 2-antenna system, where the antenna are perpendicular, the counter rotating field and clockwise rotating fields are created independently from each other. When pulsed at the same time the two antennae create a dual antenna pulse.

CP pulses and RCP pulses may also be referred to as resonant pulses and non-resonant pulses, respectively, due to their influence on substances in NMR target volumes. It is convenient to use resonant and non-resonant pulses for fields like NMR, where resonant and non-resonant pulses have distinct effects. In NMR, resonant pulses influence total magnetization of target substances while non-resonant pulses have minimal effect on total magnetization.

Figure 4:
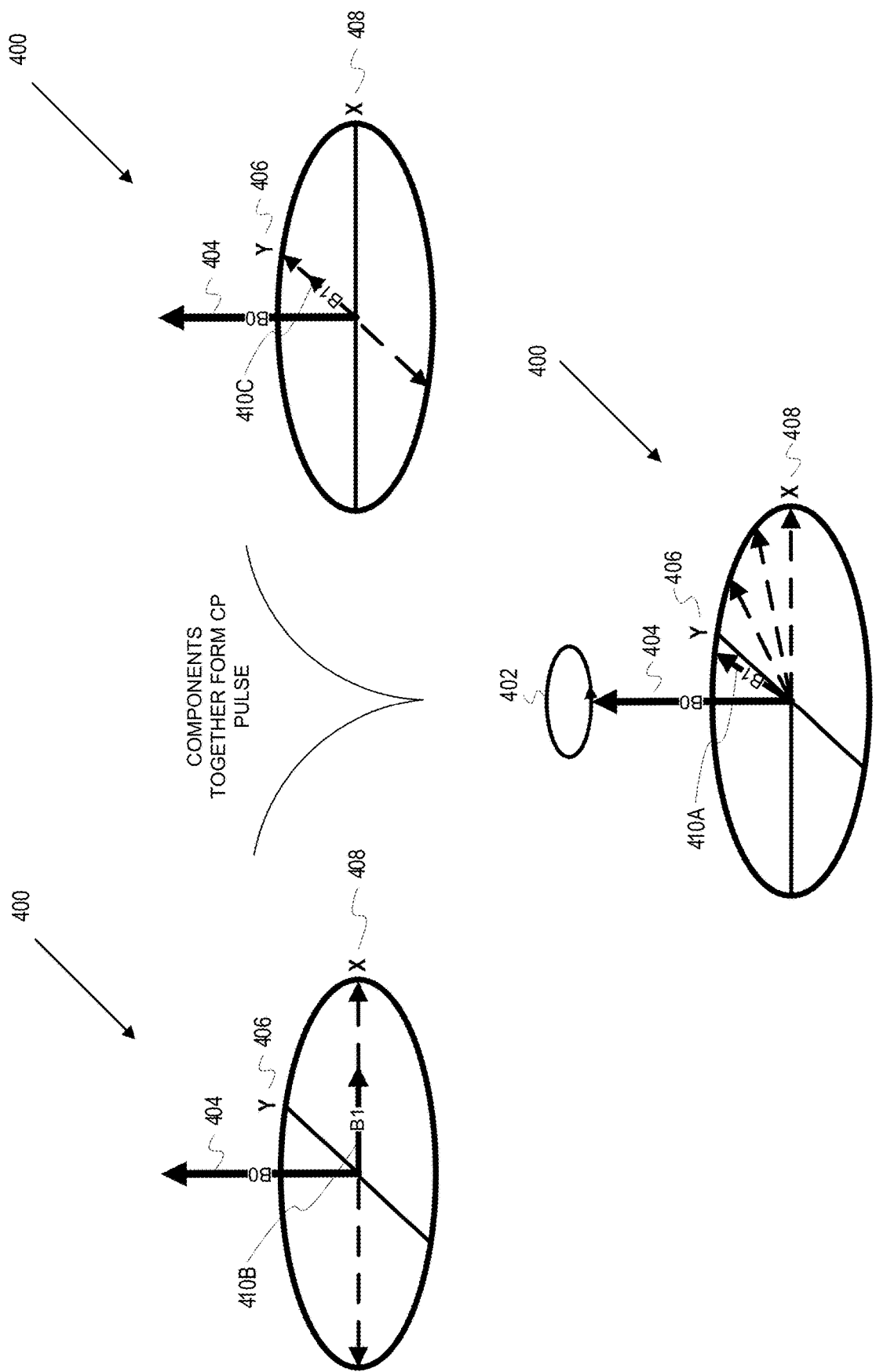
FIG. 4 depicts a constant static magnetic field, two linearly polarized oscillating magnetic fields along different axes during a dual antenna pulse, and a circularly polarized oscillating magnetic field composed from the two linearly polarized oscillating magnetic fields.

FIG. 4 depicts a constant static magnetic field, two linearly polarized oscillating magnetic fields along different axes during a dual antenna pulse, and a circularly polarized oscillating magnetic field composed from the two linearly polarized oscillating magnetic fields. FIG. 4 depicts a reference frame 400. The reference frame 400 has a y-axis 406 and an x-axis 408. The x-axis 408 and y-axis 406 are perpendicular to a static magnetic field ($B_0$) 404, in the transversal plane to $B_0$. The rotationally varying magnetic field 410A precesses about a circle in the x-y plane (as indicated by the dashed lines). The direction of rotation of the rotationally varying magnetic field 410A is indicated by arrow 402. Linearly polarized magnetic fields 410B, 410C oscillate along the x-axis 408 and the y-axis 406, respectively. The rotationally varying magnetic field 410A is composed of the two varying magnetic fields 410B and 410C. This is represented mathematically by Equations (5)-(7). A CP pulse is created by the combination of varying magnetic fields along separate axes and turning on the field for limited amounts of time. The x-component (represented in FIG. 4 by 410B) of a CP pulse is given rotationally by Equation (5):

$$B_{rf_x}(t) = B1\cos(\omega_{ref}t + \varphi_{p_1})e_x = 2b_1\cos(\omega_{ref}t + \varphi_{p_1})e_x. \quad (5)$$

The CP pulse 410A is generated by firing two antennas simultaneously. The antennas are generally placed to be physically orthogonal to each other. The antennas should have $\pi/2$ radian phase difference, $\varphi_{p_1} - \varphi_{p_2} = \pi/2$, where a second antenna is fired at $\pi/2$ radian phase shift from a first antenna. This can be implemented by a phase change in the pulse or by delaying the second antenna by one-fourth of the wave period time. The second antenna has a second Amplitude B2. An ideal CP pulse is created when B1=B2, which occurs when both antennas are identical and perfectly orthogonal.

The y-component (represented by FIG. 410C) of a CP pulse is given by Equation (6):

$$B_{rf_y}(t) = B2 \cos(\omega_{ref}t + \varphi_{p_2})e_y$$

Using common trigonometric identities and the assumption that B1=B2:

$$B_{rf_y}(t) = B1\cos(\omega_{ref}t + \varphi_{p_1} + \pi/2)e_y = 2b_1\sin(\omega_{ref}t + \varphi_{p_1})e_y. \quad (6)$$

Equations 5 and 6 combine to create a rotationally varying magnetic field (represented in FIG. 4 by 410A) given by Equation (7):

$$B_{rf_{cp}}(t) = B1\cos(\omega_{ref}t + \varphi_{p_1})e_x + B1\sin(\omega_{ref}t + \varphi_{p_1})e_y = \quad (7)$$
$$2b_1\cos(\omega_{ref}t + \varphi_{p_1})e_x + 2b_1\sin(\omega_{ref}t + \varphi_{p_1})e_y.$$

Figure 5:
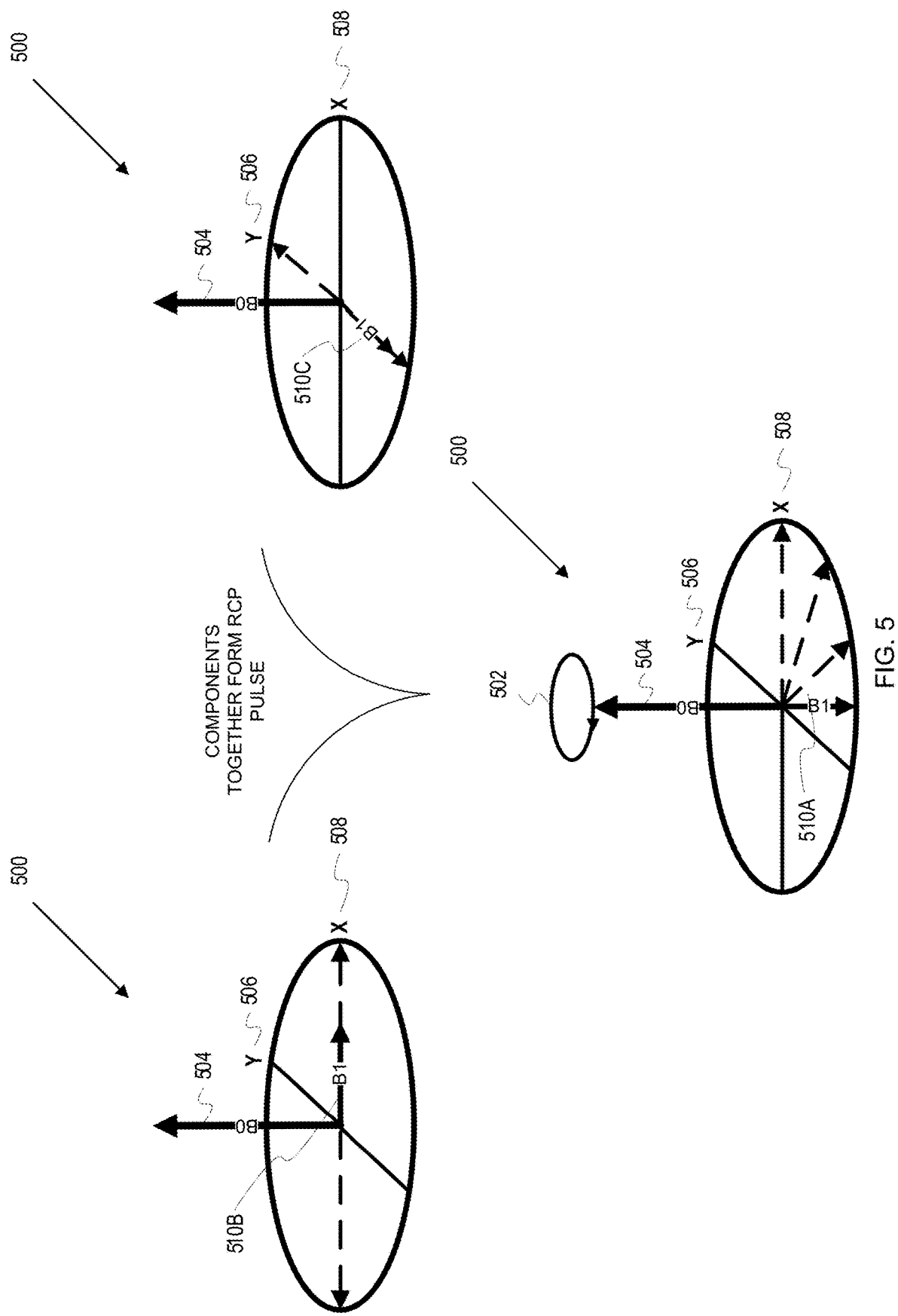
FIG. 5 depicts a constant static magnetic field, two linearly polarized oscillating magnetic fields along different axes during a dual antenna pulse, and a reverse circularly polarized oscillating magnetic field composed from the two linearly polarized oscillating magnetic fields.

FIG. 5 depicts a constant static magnetic field, two linearly polarized oscillating magnetic fields along different axes during a dual antenna pulse, and a reverse circularly polarized oscillating magnetic field composed from the two linearly polarized oscillating magnetic fields. FIG. 5 depicts a reference frame 500 that has a y-axis 506 and an x-axis 508. The x-axis 508 and y-axis 506 are perpendicular to a static magnetic field ($B_0$) 504, in the transversal plane to $B_0$.

A rotationally varying magnetic field ($B_1$) 510A, corresponds to an RCP pulse. The rotationally varying magnetic field 510A precesses about a circle in the x-y plane (as indicated by the dashed lines). The direction of rotation of the rotationally varying magnetic field 510A is indicated by arrow 502. Varying magnetic fields 510B, 510C oscillate along the x-axis 508 and the y-axis 506, respectively. With reference to FIG. 4, the varying magnetic field 510C is equivalent to the varying magnetic field 410C with a π radian phase shift. The rotationally varying magnetic field 510A is composed by a summing of the two oscillating magnetic fields 510B and 510C. This is represented mathematically by Equations (8)-(10). A varying magnetic field is created by the combination of varying magnetic fields along separate axes. The component along the x-axis (represented in FIG. 5 by 510B) is given by Equation (8):

$$B_{rf_x}(t) = B1\cos(\omega_{ref}t + \varphi_{p_1})e_x = 2b_1\cos(\omega_{ref}t + \varphi_{p_1})e_x. \quad (8)$$

The component along the y-axis (represented in FIG. 5 by 510C) is given by Equation (9):

$$B_{rf_y}(t) = B1\cos(\omega_{ref}t + \varphi_{p_3})e_y = 2b_1\sin(\omega_{ref}t + \varphi_{p_1} + \pi)e_y = \quad (9)$$
$$-2b_1\sin(\omega_{ref}t + \varphi_{p_1})e_y = 2b_1\sin(\omega_{ref}t + \varphi_{p_1} + \pi)e_y$$

Where $\varphi_{p_2} - \varphi_{p_3} = \pi$.

Combing Equations (8) and (9) creates a varying magnetic field, that along with a static magnetic field, are components of an RCP pulse given by Equation (10):

$$B_{rf_{rcp}}(t) = B1\cos(\omega_{ref}t + \varphi_{p_1})e_x - B1\sin(\omega_{ref}t + \varphi_{p_1})e_y = \quad (10)$$
$$2b_1\cos(\omega_{ref}t + \varphi_{p_1})e_x - 2b_1\sin(\omega_{ref}t + \varphi_{p_1})e_y.$$

The rotationally varying magnetic field 510A is generated by firing two antennas simultaneously. To generate the components (510B, 510C) to create the RCP pulse, a second antenna is physically orthogonal from a first antenna. The second antenna is pulsed with a π radian phase shift from the first antenna. This can be implemented either by a phase change in the pulse or by delaying the second antenna by three-fourths of the wave period time.

Figure 6B:
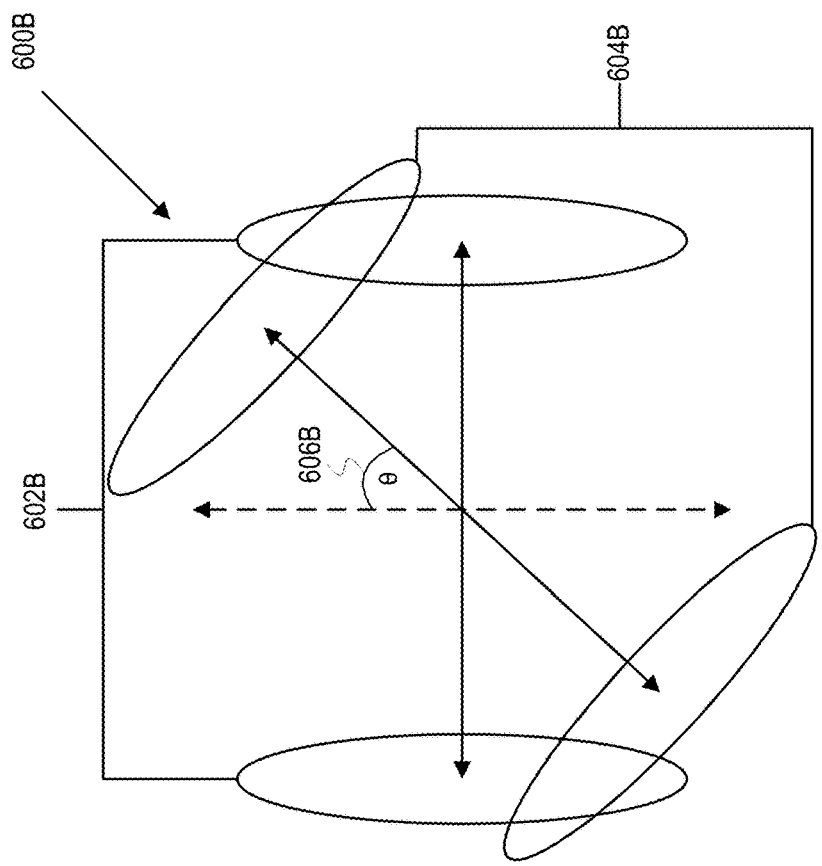
FIGS. 6A-6B depict example quadrature antennas, according to some embodiments.
Figure 6A:
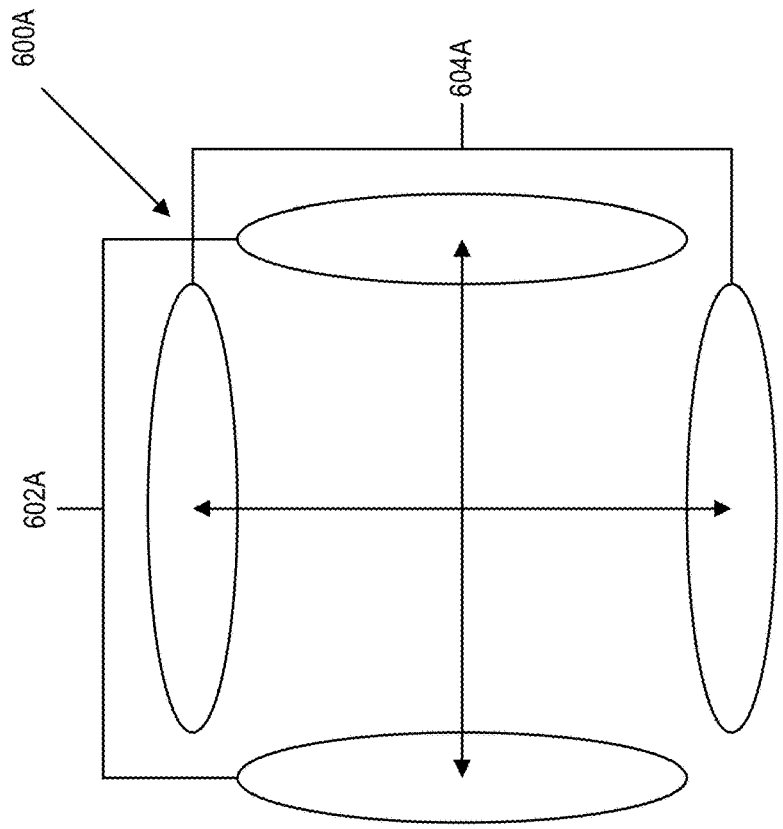

FIGS. 6A-6B depict example quadrature antennas, according to some embodiments. FIG. 6A depicts a properly aligned quadrature antenna, according to some embodiments. A first antenna 602A and a second antenna 604A are precisely 90° out of phase.

The field created by the first antenna is designated as $B1_1$. The total CP pulse generated by the two antennas 602A and 604A is given by Equation (11):

$$B_{rf_{CP}}(t) = \quad (11)$$
$$B_{rf_{CP_1}}(t) + B_{rf_{CP_2}}(t) = B_2\cos(\omega_{ref}t + \varphi_p)e_x + B_1\sin(\omega_{ref}t + \varphi_p)e_y$$

Where $B_{1CP}$ is the CP component from the first antenna 602A, $B_{2CP}$ is the CP component from the second antenna 604A, $B_1$ is the magnitude of the magnetic field produced by the first antenna 602A, and $B_2$ is the magnitude of the magnetic field produced by the second antenna 604A.

The total RCP pulse generated by the two antennas 602A and 604A is given by Equation (12):

$$B_{rf_{RCP}}(t) = B_{rf_{RCP_1}}(t) + B_{rf_{RCP_2}}(t) = \quad (12)$$
$$B_2\cos(\omega_{ref}t + \varphi_p)e_x - B_1\sin(\omega_{ref}t + \varphi_p)e_y$$

Where $B_{1RCP}$ is the RCP component from the first antenna 602A, $B_{2RCP}$ is the RCP component from the second antenna 604A, $B_1$ is the magnitude of the magnetic field produced by the first antenna 602A, and $B_2$ is the magnitude of the magnetic field produced by the second antenna 604A. If the two antennas 602A, 604A are taken to produce magnetic fields with equal magnitude, then Equations (10) and (11) are equivalent to Equations (2) and (3). For the purposes of this disclosure, $B_1$ and $B_2$ are assumed to be equal.

FIG. 6B depicts a misaligned quadrature antenna, according to some embodiments. A second antenna 604B is tilted at an imperfection angle θ away from being 90° out of phase with a first antenna 602B. If the two antenna coils are not orthogonal, then the imperfect CP and RCP pulses generated by the two antennas are given by:

$$B'_{rf_{CP}}(t) = B'_{rf_{CP_1}}(t) + B'_{rf_{CP_2}}(t) = B_1\cos(\theta)B_{res} + 2B_1\sin\left(\frac{\theta}{2}\right)B_x^{linear} \quad (13)$$

$$B'_{rf_{RCP}}(t) = \quad (14)$$
$$B'_{rf_{RCP_1}}(t) + B'_{rf_{RCP_2}}(t) = B_1\cos(\theta)B_{nonres} - 2B_1\sin\left(\frac{\theta}{2}\right)B_x^{linear'}$$

Where $B_{res}$, $B_{nonres}$, $B_x^{linear}$, and $B_x^{linear'}$ are vectors and $B_1$ has been taken to be equivalent to $B_2$. $B_{res}$ and $B_{nonres}$ are defined as $B_{rf,resonant}$ and $B_{rf,non-resonant}$ in Equations (2) and (3). $B_x^{linear}$ and $B_x^{linear'}$ are linear pulses given by Equations (15) and (16) below:

$$B_x^{linear} = \sin\left(\omega_{ref}t + \varphi_p + \frac{\theta}{2}\right)e_x \quad (15)$$

$$B_x^{linear\prime} = \sin\left(\omega_{ref}t + \varphi_p - \frac{\theta}{2}\right)e_x \quad (16)$$

In Equations (12) and (13), as the imperfection angle θ goes to zero, Equations (11) and (12) are recovered (as should be expected). The linear components also disappear when the imperfection angle is a multiple of 180° (e.g., θ=180°)n, n=0, 1, 2, . . . ). For even or odd multiples of 180°, the two example antennas 602B and 604B will be aligned parallel or antiparallel. Antiparallel alignments of the two antennas 602B and 604B are equivalent to interchanging CP pulses with RCP pulses. Thus, while an imperfection angle of 0° is considered below, it is understood that an imperfection angle which is any multiple of 180° can be used to produce the same results with CP pulses and RCP pulses interchanged as appropriate.

When the imperfection angle is minimized, so is the transverse magnetization induced by the linear component of Equation (14) (the linear component of the magnetic field in Equation (13) will vanish when the imperfection angle θ=0). Under ideal conditions an RCP pulse will induce no transverse magnetization in formation substances. Thus, the induced transverse magnetization of the pulse defined by Equation (14) will vanish for small imperfection angles. This is illustrated by Equations (17) and (18) below.

In general, because NMR logging tools are designed to have no imperfection angle, the imperfection angle may be taken to be small, so a small-angle approximation can be made for θ. Nutation angle is proportional to nutation frequency, which is in turn proportional to magnetic field magnitude. The nutation angle of the linear component of the RCP pulse in Equation (14) is related to imperfection angle using a small angle approximation as given by Equation (17):

$$\varphi \sim \omega_{nut} \sim 2\sin\frac{\theta}{2} \sim \theta \quad (17)$$

Where φ is nutation angle, $\omega_{nut}$ is nutation frequency, and θ is imperfection angle. Further, the transverse magnetization of an NMR signal depends upon the sine of its nutation angle. Equation (16) shows that a small imperfection angle yields a small nutation angle, so using another small angle approximation gives the relationship of Equation (18):

$$M_0 \sim \sin\varphi \sim \theta \quad (18)$$

Where $M_0$, the transverse magnetization of the linear component of an RCP pulse with an imperfection angle θ, is shown to be proportional to the imperfection angle. Thus, the transverse magnetization induced by the linear component of RCP pulses is minimized when imperfection angle is minimized. The transverse magnetization induced by RCP pulses is discussed in further detail by the FIG. 9 description below.

A quadrature antenna can be calibrated by varying the alignment of two antennas and measuring NMR signals iteratively. These adjustments may be performed by an electric brushed, brushless, DC, or AC motor or a linear actuator in an appropriate configuration. These adjustments may be based on various measurement schemes, such as a laser device, demarcation on a compass, ultrasonic pulses, or other metrics.

Because transverse magnetization and imperfection angle have a linear relationship for small angles (from Equation (18)), based off the measurement of total magnetization at two angles, a linear coefficient (equal to transverse magnetization over imperfection angle) can be produced. This allows a rapid optimization of imperfection angle by using the known linear relationship to find an optimal positioning of the two antennas.

The imperfection angle may be adjusted according to the optimal positioning based on the linear coefficient and a new measurement can be performed. The linear coefficient may be adjusted based on the new measurement and a new optimal positioning can be calculated. The transverse magnetization is measured at the new optimal positioning, which is used to predict a new optimal positioning by adjusting the linear coefficient again. This is repeated until the transverse magnetization is minimized, passes below a predetermined threshold, or the method has undergone a predetermined number of iterations.

Measuring transverse magnetization corresponds to measuring an NMR signal. Measuring an NMR signal may comprise at least one of an FID measurement, a CPMG echo train measurement, and a Hahn Echo measurement. The integrated or peak amplitude of such signals may be used to gauge NMR signal magnitude. This method may be used in situ or in a laboratory environment.

In some embodiments, an NMR logging tool may initially be deployed in a laboratory environment. By deploying the NMR logging tool in a laboratory environment, porosity measurements may be performed on pure water in a controlled environment. The NMR signals measured for the pure water can be used to measure further NMR signals in porosity units by comparing any measured NMR signals to those of pure water. In some embodiments, the NMR signal from pure water may be used to determine a threshold for sufficiently minimized transverse magnetization (e.g., 5% of a pure water NMR signal).

Example Operations

Example operations for calibrating an NMR logging tool by minimizing imperfection angle are now described. In particular, FIGS. 7 and 8 depict flowcharts of operations to minimize the imperfection angle of a quadrature antenna with RCP pulses, according to some embodiments.

Figure 7:
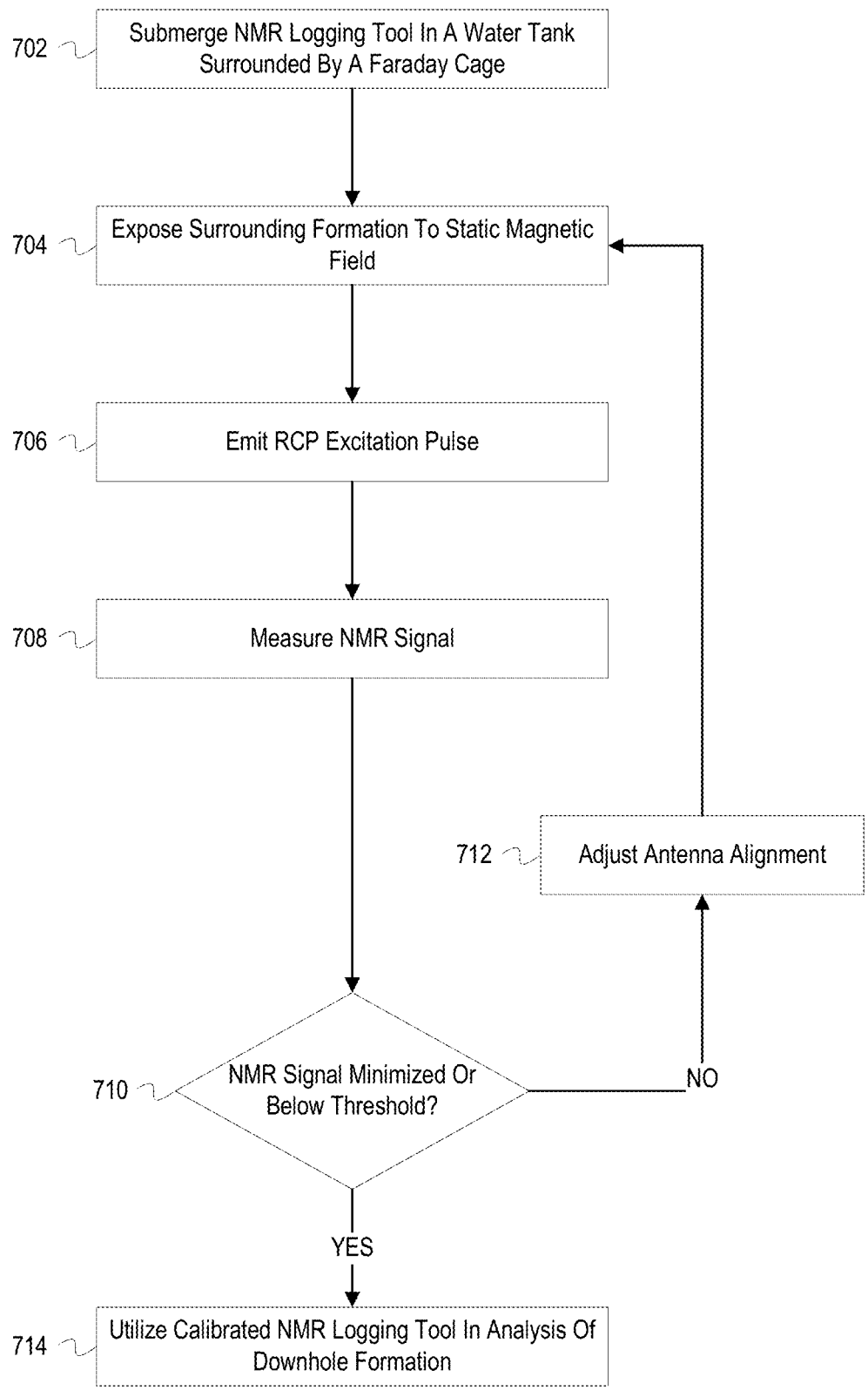
FIG. 7 depicts a flowchart of operations to align antennas, according to some embodiments.
Figure 8:
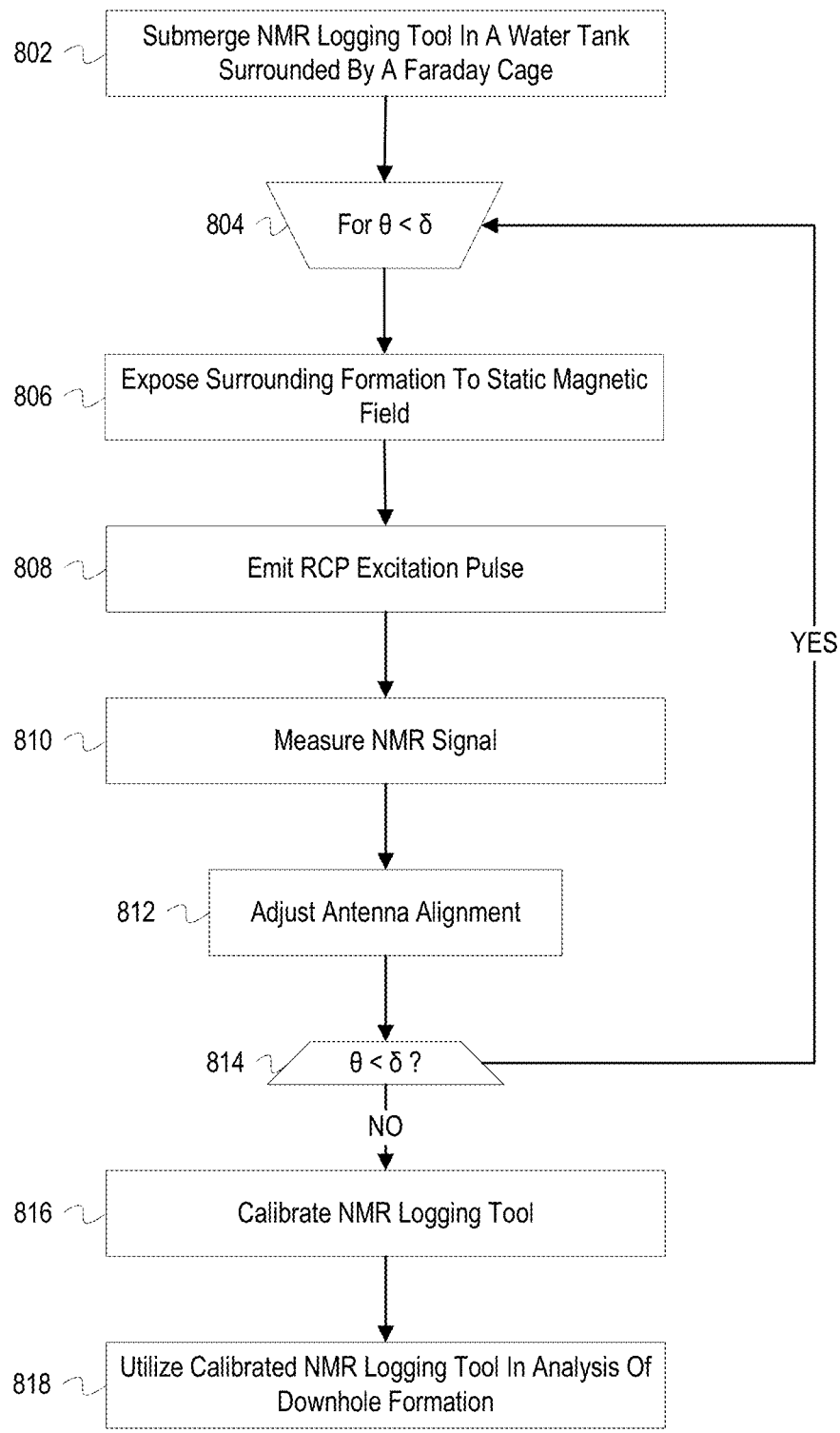
FIG. 8 depicts a flowchart of operations to align antennas, according to some embodiments.

FIG. 7 depicts a flowchart of operations to align antennas, according to some embodiments. FIG. 7 depicts a flowchart 700 that includes operations at blocks 702-714. These blocks represent stages of operations. Although these stages are ordered for this example, the stages illustrate one example to aid in understanding this disclosure and should not be used to limit the claims. Subject matter falling within the scope of the claims can vary with respect to the order and some of the operations. A first and a second antenna on an NMR logging tool are aligned at an angle of 90°−θ (θ being the imperfection angle) and emit magnetic field pulses with intended equal strength. With reference to FIG. 6B, the quadrature antenna 600B has a first antenna 602B and a second antenna 604B with an imperfection angle 606B. The first antenna 602B and the second antenna 604B are thus aligned at an angle of 90°−θ.

At block 702, the NMR logging tool is surrounded by a water tank surrounded by a faraday cage. The initial calibration of the NMR logging tool is performed in a laboratory setting, but calibration may also be performed or updated in a downhole environment.

At block 704, the NMR logging tool exposes the surrounding formation to a static magnetic field. Exposure to a static magnetic field polarizes formation substances (e.g., sedimentary layers, rock layers, sand layers, or other types of geologic formations or fluids, such as light or heavy oils, gas, etc.). The NMR logging tool has a static magnetic field $B_0$. A defined time period is allowed such that the static magnetic field sufficiently polarizes the magnetization of formation substances. In some embodiments, total polarization may not be desirable, so the defined time period may be shortened accordingly.

At block 706, the NMR logging tool emits an RCP excitation pulse. The phrase "RCP excitation pulse" refers to a varying magnetic field which has been generated by a quadrature antenna. An intended RCP pulses from an imperfectly aligned set of antennas contain a CP portion which will excite the magnetization. Over time, the induced transverse magnetization will decay towards the direction of the static magnetic field. In some embodiments, this decay can be measured as an FID signal to determine the induced transverse magnetization. In general, FID signals are described by Equation (19):

$$M(t) = M_0 e^{\frac{-t}{T_2^*}} \quad (19)$$

Where M(t) is the measured FID signal of a reverse elliptically polarized pulse, $M_0$ is the peak induced transverse magnetization, $T_2^*$ is the "effective" spin-spin relaxation time, and t is time. In most embodiments a CPMG sequence will be run and Echoes collected. The echo signal is described by equation (20).

$$\text{Echo}(n) = M_0 e^{\frac{-nTE}{T_2^*}} \quad (20)$$

where n is the number of echoes, $M_0$ is the peak induced transverse magnetization, $T_2^*$ is the "effective" spin-spin relaxation time, and TE is the echo time.

At block 708, the NMR logging tool measures an NMR signal. Measuring an NMR signal comprises measuring response signals indicative of transverse magnetization in formation substances. The signals are received by an antenna via quadrature detection. NMR signals may comprise one or more of an FID signal, a CPMG signal, and a Hahn Echo signal. Measuring NMR signals may comprise the use of various statistical methods to minimize noise and error. The measurement methodology may also vary between different implementations of the NMR logging tool.

At block 710, it is determined whether the measured NMR signal satisfies a threshold. The threshold corresponds to a minimized transverse magnetization threshold. The threshold is determined in a lab prior to deployment of the NMR logging tool in a downhole environment in block 902. Adjustments to the antenna are performed with a full tank of water and a faraday cage. The full tank of water maximizes the signal potential while the faraday cage removes outside noise. The system is minimized by taking the magnitude of the return signal and plotting it against either a distance or angular measurement. This plot reveals a minimal return signal where the antennae should be aligned. For example, a comparison of an RCP signal to a CP signal producing a signal ratio below 1% indicates a good threshold value.

Satisfying the threshold in some cases is determining that the NMR signal measurement is minimized or below the threshold. If the threshold is not satisfied, the flow of operations continues to block 712. If the threshold is satisfied, then the flow of operations continues to block 714. The determination of whether the measured NMR signal is minimized or below a set threshold may be made based on the value of the measured NMR signal or an average of a number of measured NMR signals.

At block 712, the NMR logging tool adjusts the antenna alignment. The adjustment of antenna alignment corresponds to incrementing the imperfection angle θ by a value of Δθ. The NMR logging tool includes a motor(s) that can adjust the antennas by a controller programmed to make the adjustments at Δθ increments of or fractions of Δθ. This may comprise using an electric brushed, brushless, DC, or AC motor or a linear actuator in an appropriate configuration to shift, rotate, or otherwise align two or more antenna coils in the quadrature antenna based on an adjustment of distance or angle between the two or more antenna coils. Alternatively, adjusting the antennas may comprise using a removable mechanical apparatus (which could include a hand) that can move the antenna around. The antenna alignment may be adjusted in one of two directions based on the relative magnitude of the previous two NMR signal measurements. The flow of operations then returns to block 704. The antenna alignment is adjusted and tested until it is determined at block 710 that the NMR signal is minimized or below a predetermined threshold. Once the measured signal is minimized or below a set threshold, the flow of operations continues to block 714.

At block 714, the lab calibrated NMR logging tool is deployed downhole and utilized in analysis of the downhole formation. In some embodiments, the NMR logging tool may be deployed in a wireline logging application or an LWD application. Based on the calibration of the NMR logging tool at blocks 706-712, the NMR logging tool can perform analysis of the downhole formation with regards to magnetic properties, hydrocarbon and fluid porosity, and the detection and identification of various formation materials by measuring NMR signals. In some cases, the NMR logging tool may provide its measurements to another computer system for analysis. A second computer system may be located downhole with the NMR logging tool, on the surface with data transmit via data cables along the drill string or telemetry, or off-site with data transmit wirelessly over a network.

FIG. 8 depicts a flowchart of operations to align antennas, according to some embodiments. FIG. 8 depicts a flowchart 800 that includes operations at blocks 802-816. Embodiments can iteratively adjust antenna orientation until a minimized transverse magnetization threshold is satisfied as already described. Other embodiments, an example of which is depicted in FIG. 8, can obtain NMR measurements at different antenna orientations for a configuration phase (e.g., a number of different antenna orientations) and then select from these orientations the orientation that corresponds to a smallest transverse magnetization measurement. Embodiments may also align antennas with minimized or reduced imperfection angle with a combination of a configuration phase and satisfying a threshold. For instance, the configuration phase can be performed until n orientations satisfy the threshold and then the one of those n orientations with the smallest measurement is chosen.

A first and a second antenna on an NMR logging tool are aligned at an angle of 90°−θ (θ being the imperfection angle) and emit magnetic field pulses of equal strength. With reference to FIG. 6B, the quadrature antenna 600B has a first antenna 602B and a second antenna 604B with an imperfection angle 606B. The first antenna 602B and the second antenna 604B are thus aligned at an angle of 90°−θ.

At block 802, the NMR logging tool is surrounded by a water tank surrounded by a faraday cage. The initial calibration of the NMR logging tool is performed in a laboratory setting, but calibration may also be performed or updated in a downhole environment.

At block 804, an operative loop is initiated and is iteratively performed based on the imperfection angle θ. The alignment angle between antennas begins at the imperfection angle and is incremented to a predetermined positive value δ (accepted or minimized imperfection angle) from an initial value less than or equal to −δ. The imperfection angle θ is incremented by a predetermined value of Δθ, and the operative loop thus takes at least 2δ/Δθ steps.

At block 806, the NMR logging tool exposes the surrounding formation to a static magnetic field. Exposure to a static magnetic field polarizes formation substances (e.g., sedimentary layers, rock layers, sand layers, or other types of geologic formations or fluids, such as light or heavy oils, gas, etc.). The NMR logging tool emits a static magnetic field $B_0$ for a defined time period such that the static magnetic field sufficiently polarizes the magnetization of formation substances. In some embodiments, total polarization may not be desirable, so the defined time period may be shortened accordingly.

At block 808, the NMR logging tool emits an RCP excitation pulse. RCP excitation pulses include a linear component as given by Equation (14) which induces transverse magnetization in formation substances. Over time, the induced transverse magnetization will decay towards the direction of the static magnetic field. In some embodiments, this decay can be measured as an FID signal to determine the induced transverse magnetization. In general, FID signals are described by Equation (19).

At block 810, the NMR logging tool measures an NMR signal. Measuring an NMR signal comprises measuring response signals indicative of transverse magnetization in formation substances. NMR signals may comprise one or more of an FID signal, a CPMG signal, and a Han Echo signal. Measuring NMR signals may comprise the use of various statistical methods to minimize noise and error. The measurement methodology may also vary between different implementations of the NMR logging tool.

At block 812, the antenna alignment is adjusted. The adjustment of antenna alignment corresponds to incrementing the imperfection angle θ by a value of Δθ. This may comprise using an electric brushed, brushless, DC, or AC motor or a linear actuator in an appropriate configuration to shift, rotate, or otherwise align two or more antenna coils in the quadrature antenna based on an adjustment of distance or angle between the two or more antenna coils in the quadrature antenna arrangement based on an adjustment of distance or angle between the two or more antenna coils.

In some embodiments, the first adjustment in antenna alignment may follow a unique series of operations. The first adjustment in antenna alignment may comprise adjusting the antenna alignment in a first direction by a value of Δθ, emitting an RCP excitation pulse, measuring an NMR signal, and performing further adjustment in antenna alignment based on the measured NMR signal. If the newly measured NMR signal is greater than the NMR signal measured at block 810, then the imperfection angle is adjusted by a value of 2Δθ in a second direction opposite to the first direction of adjustment. If the newly measured NMR signal is less than the NMR signal measured at block 810, then the imperfection angle is adjusted again in the first direction by a value of Δθ. In some cases, the newly measured NMR signal may be equal to or within the system noise level of the NMR signal measured at block 810. In such cases, additional NMR signals may be measured in either direction. The first two NMR signals (at block 810 and during the first adjustment of antenna alignment) may be compared to the additional measured NMR signals to determine a direction to adjust antenna alignment. If NMR signals in either direction of the first two measured NMR signals are larger than the first two measured NMR signals, then the antenna may be calibrated by adjusting the antenna alignment between the first two measured NMR signals. Alternately, the value of Δθ may be decreased in such cases to increase the resolution of investigation.

At block 814, a determination is made of whether θ is less than δ. If θ is less than δ, then the flow of operations returns to block 804. If θ is greater than or equal to δ, then the flow of operations continues to block 816.

At block 816, the NMR logging tool is calibrated. Calibrating the NMR logging tool comprises minimizing the NMR signal from excitation RCP pulses. According to Equation (18), this may be accomplished by minimizing the imperfection angle θ. Based on the NMR signals measured at block 810, the antenna alignment corresponding to the smallest measured NMR signal indicates the smallest imperfection angle. Thus, the NMR logging tool is calibrated by returning to the position which corresponds to the smallest measured NMR signal at block 810.

At block 818, the calibrated NMR logging tool is utilized in analysis of the downhole formation. Based on the calibration of the NMR logging tool at block 816, the NMR logging tool can perform analysis of the downhole formation with regards to magnetic properties, hydrocarbon and fluid porosity, and the detection and identification of various formation materials by measuring NMR signals. In some cases, the NMR logging tool may provide its measurements to another computer system for analysis. A second computer system may be located downhole with the NMR logging tool, on the surface with data transmit via data cables along the drill string or telemetry, or off-site with data transmit wirelessly over a network.

Example NMR Signal

Figure 9:
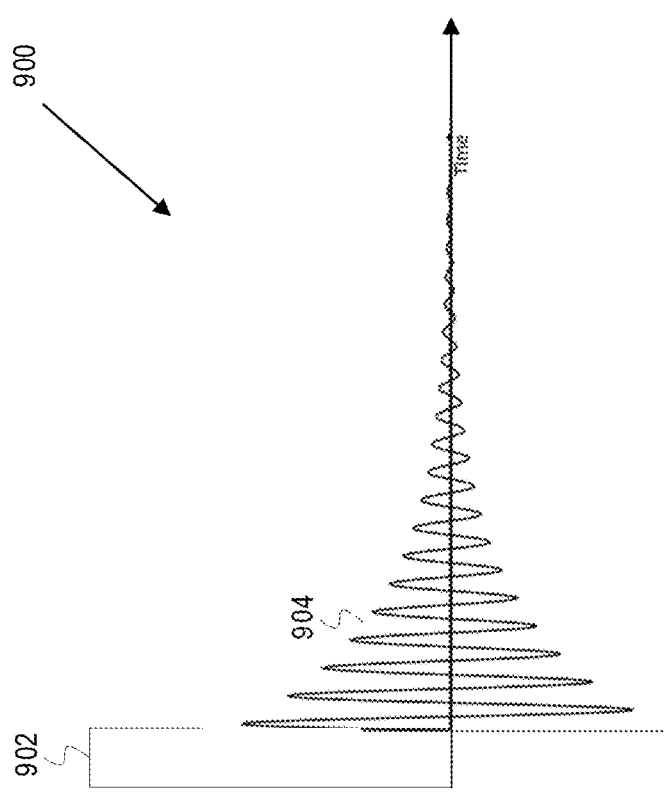
FIG. 9 depicts an example free induction decay (FID) signal, according to some embodiments.

FIG. 9 depicts an example free induction decay (FID) signal, according to some embodiments. A graph 900 has an RCP excitation pulse 902 and an FID signal 904. With reference to FIGS. 7 and 8, the graph 900 illustrates an example NMR signal that could be measured at block 708 or at block 810 after emitting the RCP excitation pulse 902 as at block 706 or block 808. The excitation RCP pulse 902 is generated by a quadrature antenna with an imperfection angle θ. Due to its imperfect alignment, the quadrature antenna may produce the excitation RCP pulse 902 with linear components. As a result, the FID signal 904 will decay exponentially because of the natural decay via dipolar interaction and the gradient magnetic field.

The amplitude of the FID signal 904 is described by Equation (18). As imperfection angle increases and decreases, the FID signal peak 904 will increase and decrease in turn. Thus, by performing multiple measurements of FID signals like the FID signal 904 with adjusted imperfection angle for each measurement, the smallest measured FID signal corresponds to a minimized imperfection angle. The magnitude of each FID signal may be calculated by taking the measured peak amplitude of the FID signal, extrapolating a peak amplitude of the FID signal, or integrating the FID signal.

Figure 10:
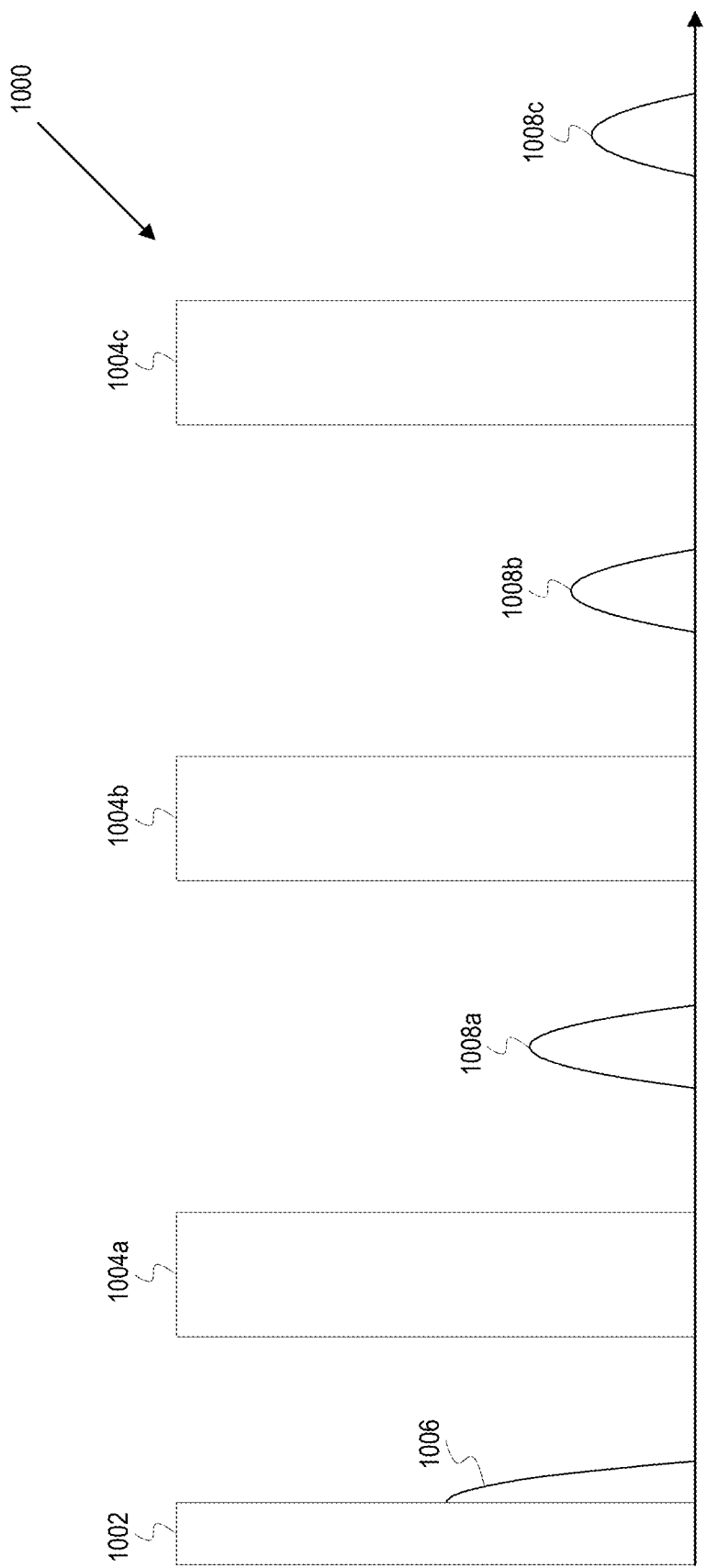
FIG. 10 depicts a CPMG echo train initiated with an RCP excitation pulse, according to some embodiments.

FIG. 10 depicts a CPMG echo train initiated with an excitation RCP pulse, according to some embodiments. A graph 1000 includes an initial intended RCP 90° pulse 1002 and multiple CP recovery pulses 1004a-c as well as an initial echo signal 1006 and echo signals 1008a-c.

The initial RCP excitation pulse 1002 can be generated by a quadrature antenna. Since the physical location of each antenna is not radially at the same place the antennas may be driven with unequal amplitudes. The intention is to get as close to a true circular pulse as possible. The best driving of each antenna is found which maximizes the signal return. This amplitude, with a fixed pulse duration is the intended 90°. However, if the antennas are not set truly perpendicular to each other the maximal signal won't truly be achieved and the intended 90 may not be a true 90. The generated initial excitation RCP pulse 1002 is not a 90° pulse. The RCP may not be able to achieve a 90° pulse due to the power limitation of the electronics. Either the RCP can be driven as hard as the electronics allow, hard enough to get a 90° pulse, or at the same level to which the CP achieved a 90° pulse. Driving the coils harder in the RCP can increase the NMR signal amplitude of the resulting initial echo signal 1006 (which would be negligibly small for an ideal 90° pulse). In that case, it is harder to achieve a 90° pulse with RCP excitation as the antenna alignment approaches perpendicular. With reference to FIGS. 1 and 2, the NMR logging tools 190 and 200 are appropriate for generating a CPMG echo train. By using a sequence of CP recovery pulses 1004a-c, a sequence of echo signals 1008a-c can be generated. The generated echo signals 1008a-c and the initial echo signal 1006 form a CPMG echo train, from which an NMR signal amplitude can be measured. The initial RCP excitation pulse 1002 is reverse elliptically polarized due to imperfections in the RCP pulse. Thus, an FID measurement can be used to measure the CPMG echo train NMR signal amplitude.

Example NMR Logging Systems

Figure 11:
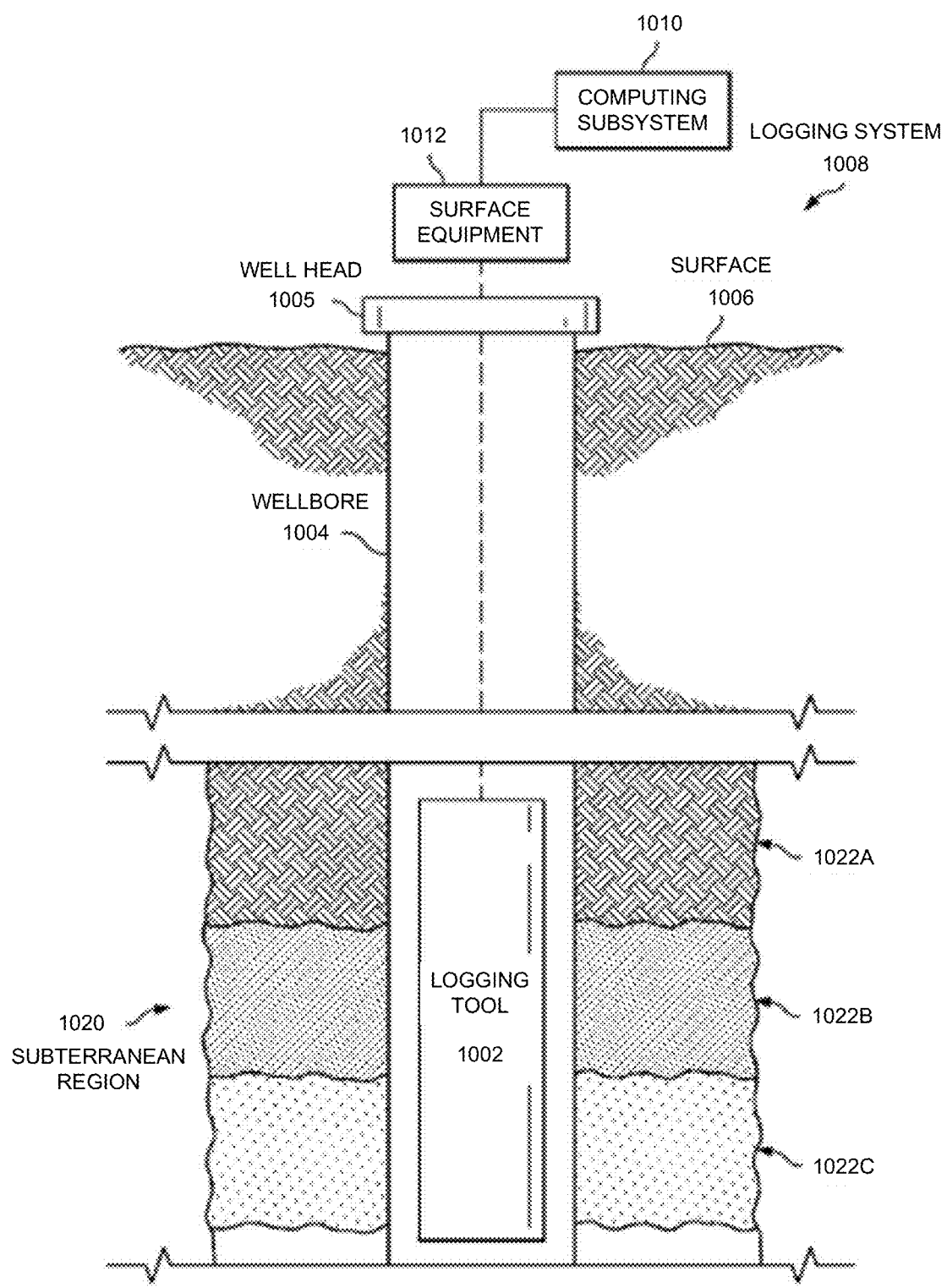
FIG. 11 depicts an NMR logging system employing CP and RCP pulses to measure NMR signals, according to some embodiments.

FIG. 11 depicts an NMR logging system employing CP and RCP pulses to measure NMR signals, according to some embodiments. An NMR logging system 1008 includes an NMR logging tool 1102 deployed in a wellbore 1104 and communicatively coupled to surface equipment 1112, which is in turn communicatively coupled to a computing subsystem 1110. The NMR logging tool 1102 is deployed through a well head 1105 at the surface 1106 and is in a subterranean region 1120 comprised of multiple geologic formations 1122A, 1122B, and 1122C. The NMR logging system 1108 may be included as a component of a larger downhole logging while drilling (LWD) system, wireline logging system, etc.

Figure 13:
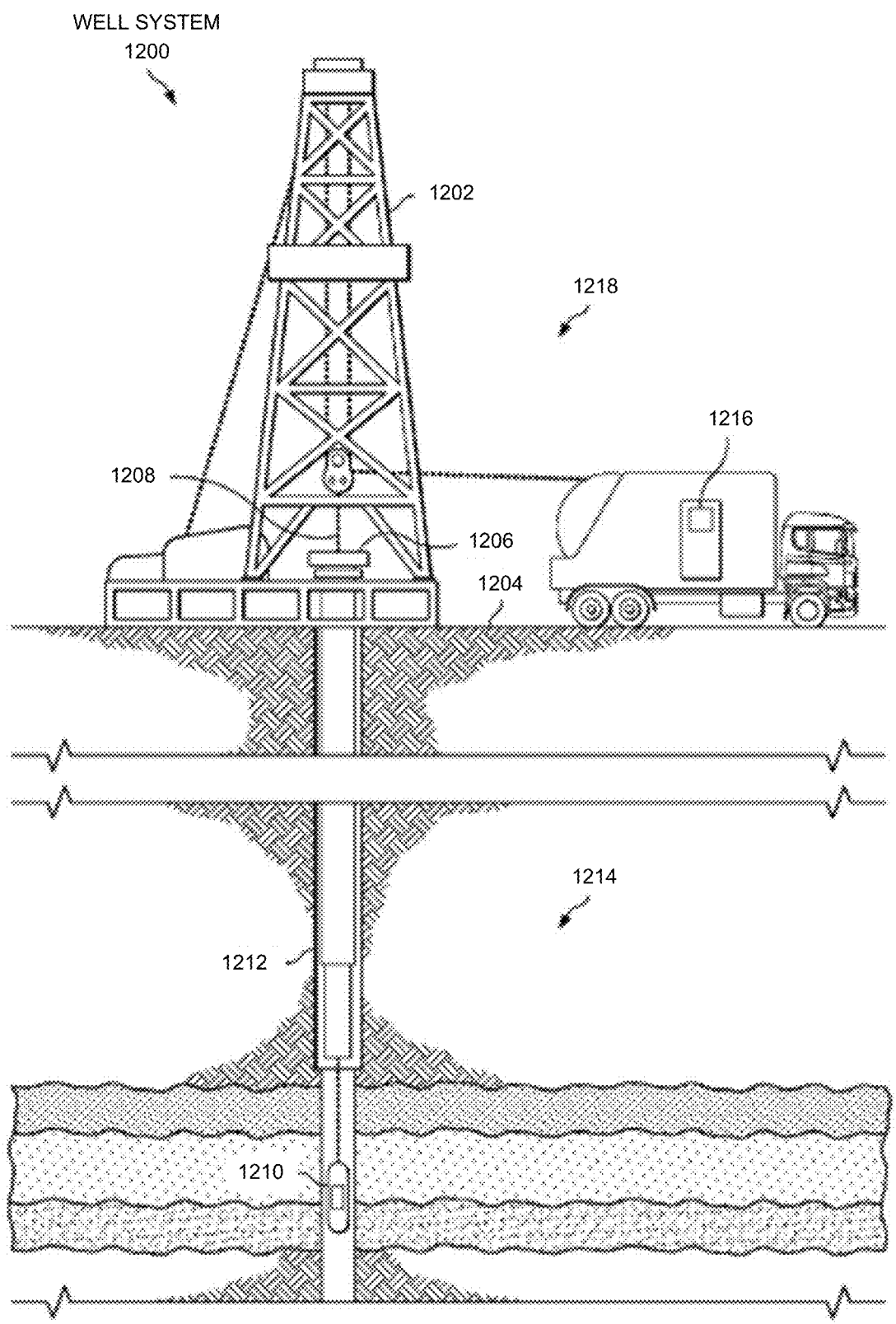
FIG. 13 depicts a wireline logging apparatus employing CP and RCP pulses to operate a downhole wireline NMR logging tool, according to some embodiments.

The surface equipment 1112 may include various equipment operating at the surface, such as an oil derrick, draw works, a computer system, etc. With reference to FIG. 13, the surface equipment 1318 is an appropriate example of surface equipment. The type and function of the surface equipment 1112 may depend upon the application of the NMR logging system 1108. The computing subsystem 1110 is depicted on the surface, but it may also be included on the NMR logging tool 1102 or communicatively coupled to the surface equipment 1112 over a network.

The subterranean region 1120 includes the geologic formations 1122A, 1122B, and 1122C, which may be sedimentary layers, rock layers, sand layers, or other types of geologic formations or fluids, such as light or heavy oils, gas, etc. The NMR logging tool 1102 may be raised or lowered within the wellbore 1004 to investigate each geologic formation 1122A, 1122B, and 1122C. The NMR logging tool 1102 may also be driven by a controller located on the tool, at the surface 1106, or as part of the computer system 1110. The controller may control pulse frequency, duration, and waveform for each antenna on the NMR logging tool 1102.

Figure 12:
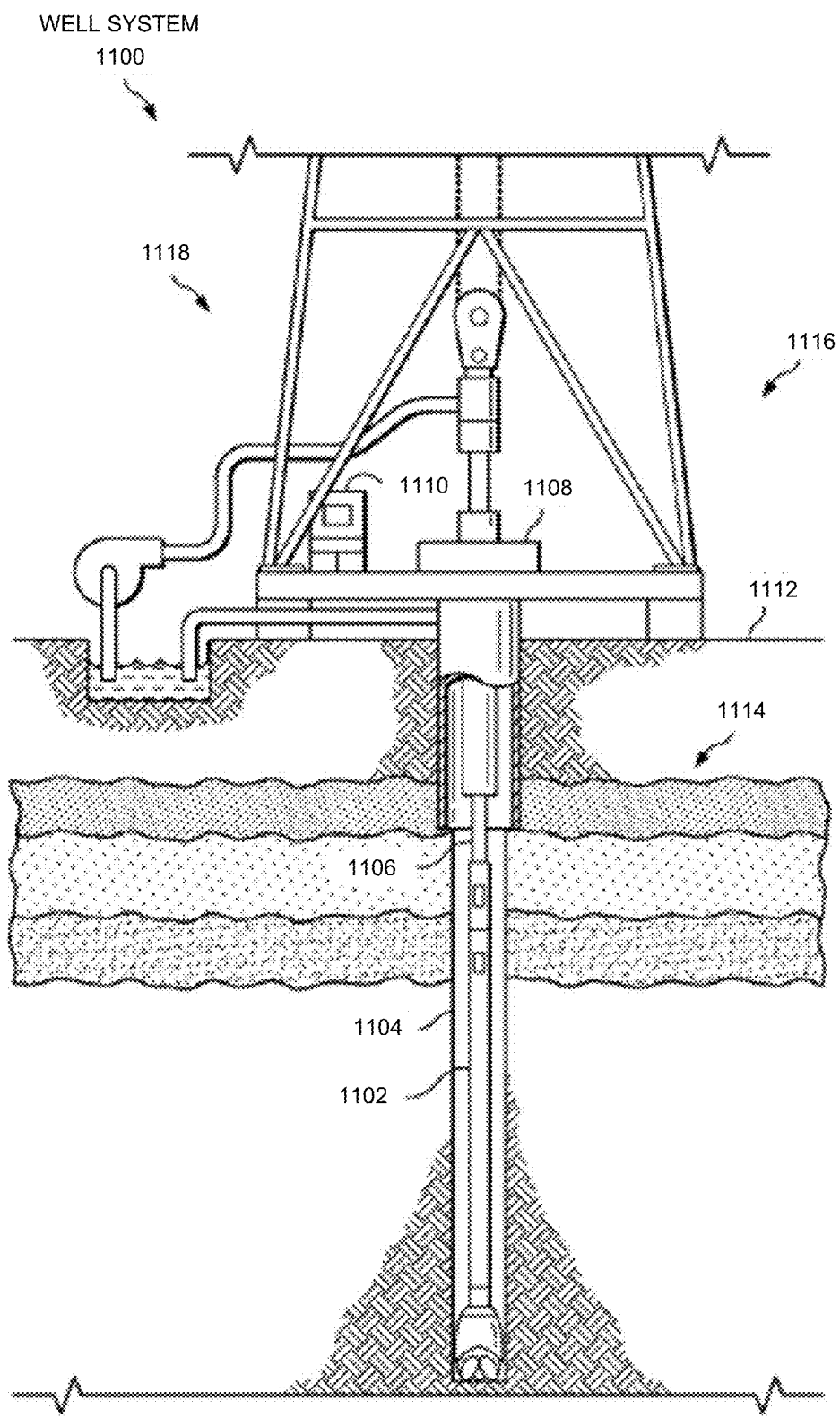
FIG. 12 depicts a drilling apparatus employing CP and RCP pulses to operate a downhole logging while drilling (LWD) NMR logging tool, according to some embodiments.

FIG. 12 depicts a drilling apparatus employing CP and RCP pulses to operate a downhole logging while drilling (LWD) NMR logging tool, according to some embodiments. An LWD system 1200 includes a derrick 1216 at the surface 1212 and an NMR logging tool 1202 on a drill string 1206 deployed in a wellbore 1204 with formations 1214. The derrick 1216 has a well head 1208 and a computer system 1210.

The NMR logging tool 1202 includes at least a quadrature antenna to produce CP and RCP pulses in the formations 1214. Using CP and RCP pulses, the NMR logging tool 1202 collects data on NMR signals which indicate characteristics of the formations 1214. Data from the NMR logging tool 1202 is communicated to the computer system 1210. In some embodiments, the computer system 1210 may be located at the surface 1212, integrated into the NMR logging tool 1202, or located elsewhere and fed data over a network or transferable media device.

FIG. 13 depicts a wireline logging apparatus employing CP and RCP pulses to operate a downhole wireline NMR logging tool, according to some embodiments. Surface equipment 1318 at the surface 1304 includes a wireline logging system 1300 with an oil derrick 1302, a wellhead 1306 and a wireline cable 1308. The oil derrick 1302 deploys an NMR logging tool 1310 in a borehole 1312 in a formation 1314.

The NMR logging tool 1310 includes at least a quadrature antenna to produce CP and RCP pulses in the formation 1314. Using CP and RCP pulses, the NMR logging tool 1310 collects data on NMR signals which indicate characteristics of the formation 1314. Data from the NMR logging tool 1310 is communicated to a computer system 1316. In some embodiments, the computer system 1316 may be located at the surface 1304, integrated into the NMR logging tool 1310, or located elsewhere and fed data over a network or transferable media device.

Example Computer

Figure 14:
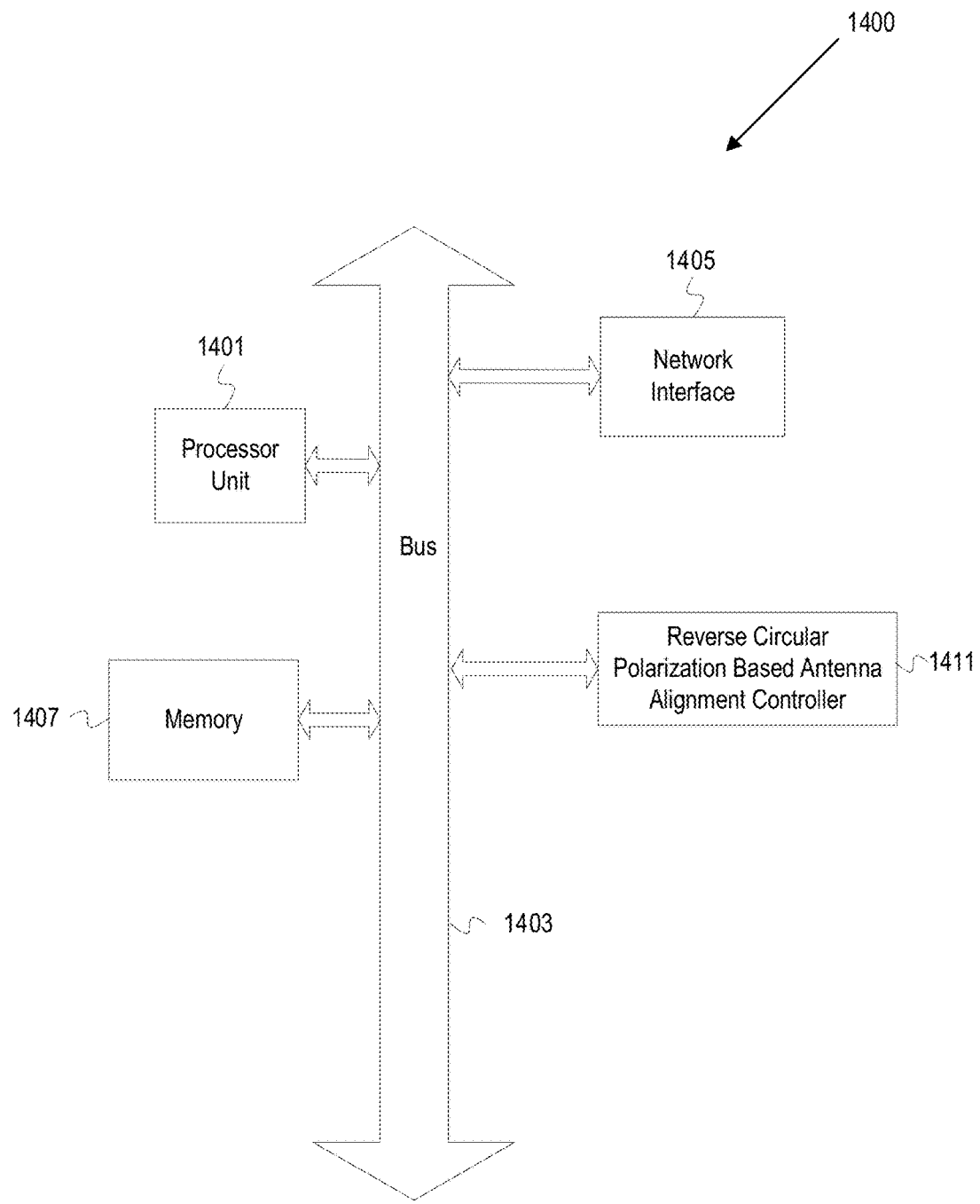
FIG. 14 depicts an example computer, according to some embodiments.

FIG. 14 depicts an example computer with a reverse circular polarization-based antenna alignment controller, according to some embodiments. A computer 1400 includes a processor 1401 (possibly including multiple processors, multiple cores, multiple nodes, and/or implementing multi-threading, etc.). The computer 1400 includes memory 1407. The memory 1407 may be system memory or any one or more of the above already described possible realizations of machine-readable media. The computer 1400 also includes a bus 1403 and a network/communication interface 1405.

The computer 1400 also includes a RCP based antenna alignment controller 1411. The RCP based antenna alignment controller 1411 includes an actuator(s) controlled according to programming that reduces an imperfection angle between antennas based on NMR signal measurements corresponding to RCP pulses. The RCP based antenna alignment controller 1411 programming may be implemented in hardware, firmware, software or a combination thereof. Further, realizations may include fewer or additional components not illustrated in FIG. 14 (e.g., video cards, audio cards, additional network interfaces, peripheral devices, etc.). The processor 1401 and the network interface 1405 are coupled to the bus 1403. Although illustrated as being coupled to the bus 1403, the memory 1407 may be coupled to the processor 1401.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 706-712 can be performed in parallel or concurrently. With respect to FIG. 8, a predetermined value for δ is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instruction stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for NMR logging tool calibration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

A method comprises obtaining one or more nuclear magnetic resonance (NMR) measurements corresponding to reverse circularly polarized (RCP) pulses. An imperfection angle is determined between antenna coils. The imperfection angle is reduced based, at least in part, on at least one of the one or more NMR measurements not satisfying a threshold. The orientation of at least one of the antenna coils is adjusted based, at least in part, on the one or more NMR measurements to reduce the imperfection angle.

The antenna coils are coaxially positioned.

The antenna coils are used to generate the RCP pulses.

Obtaining the one or more NMR measurements comprises obtaining a transverse magnetization measurement.

The threshold indicates a minimized transverse magnetization threshold.

Obtaining the one or more NMR measurements comprises measuring at least one of a field induction decay (FID) signal, a Carr-Purcell-Meiboom-Gill (CPMG) echo train, and a Hahn echo.

Additional NMR measurements are iteratively obtained and the orientation of at least one of the antennas is adjusted to reduce the imperfection angle until the threshold is satisfied.

It is determined that a first of the NMR measurements satisfies the threshold. Adjusting the orientation according to an orientation of the antenna coils corresponds to the first NMR measurement. The threshold indicates a minimal transverse magnetization for the reduced imperfection angle.

A minimal one of the NMR measurements is determined. Adjusting the orientation comprises adjusting the orientation to an orientation corresponding to the minimal one of the NMR measurements.

Determining the minimal one of the NMR measurements comprises determining which of the NMR measurements has a smallest value for at least one of a peak amplitude, integrated value, or a combination thereof.

Obtaining the NMR measurements comprises obtaining RCP pulse based NMR measurements a predefined number of times.

One or more non-transitory machine-readable media comprises program code executable by a device to perform operations. The operations comprise obtaining a plurality of transverse magnetization measurements corresponding to reverse circularly polarized (RCP) pulses at different orientations of a first and second antenna coils and adjusting the orientation of at least one of the first and second antenna coils. The adjusting is based, at least in part, on the plurality of transverse magnetization measurements to reduce an imperfection angle between the first and the second antenna coils.

Adjusting the orientation comprises adjusting to each of the different orientations until the corresponding one of the plurality of transverse magnetization measurements satisfies a threshold corresponding to a minimized transverse magnetization measurement.

Obtaining the plurality of transverse magnetization measurements comprises measuring at least one of a field induction decay (FID) signal, a Carr-Purcell-Meiboom-Gill (CPMG) echo train, and a Hahn echo.

Operations further comprise controlling the first and second antenna coils to generate RCP pulses at the different orientations and determining a minimal one of the plurality of transverse magnetization measurements. Adjusting the orientation comprises adjusting the orientation of at least one of the first and second antenna coils to one of the different orientations corresponding to the minimal one of the plurality of transverse magnetization measurements.

Determining the minimal one of the plurality of transverse magnetization measurements comprises determining which of the plurality of transverse magnetization measurements has a smallest value for at least one of a peak amplitude, integrated value, or a combination thereof.

The different orientations are predefined.

Controlling the first and second antenna coils to generate RCP pulses at the different orientations repeats until the determined minimal one of the plurality of transverse magnetization measurements satisfies a defined threshold.

A nuclear magnetic resonance logging tool comprises a first antenna coil and a second antenna coil, a set of one or more actuators coupled to orient at least one of the first and the second antenna coils, a processor, and a machine-readable medium. The machine readable medium has program code executable by the processor to cause the nuclear magnetic resonance logging tool to obtain a plurality of transverse magnetization measurements corresponding to reverse circularly polarized (RCP) pulses at different orientations of the first and second antenna coils and control the set of one or more actuators to orient at least one of the first and second antenna coils based, at least in part, on the plurality of transverse magnetization measurements to reduce an imperfection angle between the first and the second antenna coils.

The program code is executable by the processor to cause the nuclear magnetic resonance logging tool to determine a minimal one of the plurality of transverse magnetization measurements. The program code to control the set of one or more actuators to orient at least one of the first and second antenna coils comprises program code to control the set of actuators to orient to the one of the different orientations corresponding to the minimal one of the plurality of transverse magnetization measurements.

What is claimed is:

1. A method comprising:
   obtaining one or more nuclear magnetic resonance (NMR) measurements corresponding to reverse circularly polarized (RCP) pulses;
   determining that an imperfection angle between antenna coils is to be reduced based, at least in part, on at least one of the one or more NMR measurements not satisfying a threshold; and
   adjusting orientation of at least one of the antenna coils based, at least in part, on the one or more NMR measurements to reduce the imperfection angle.

2. The method of claim 1, wherein the antenna coils are coaxially positioned.

3. The method of claim 1, further comprising using the antenna coils to generate the RCP pulses.

4. The method of claim 1, wherein obtaining the one or more NMR measurements comprises obtaining a transverse magnetization measurement.

5. The method of claim 4, wherein the threshold indicates a minimized transverse magnetization threshold.

6. The method of claim 1, wherein obtaining the one or more NMR measurements comprises measuring at least one of a field induction decay (FID) signal, a Carr-Purcell-Meiboom-Gill (CPMG) echo train, and a Hahn echo.

7. The method of claim 1, further comprising iteratively obtaining additional NMR measurements and adjusting orientation of at least one of the antenna coils to reduce the imperfection angle until the threshold is satisfied.

8. The method of claim 1, further comprising determining that a first of the NMR measurements satisfies the threshold, wherein adjusting the orientation comprises adjusting the orientation according to an orientation of the antenna coils corresponding to a first NMR measurement and wherein the threshold indicates a minimal transverse magnetization for reduced imperfection angle.

9. The method of claim 1, further comprising determining a minimal one of the NMR measurements, wherein adjusting the orientation comprises adjusting the orientation to an orientation corresponding to the minimal one of the NMR measurements.

10. The method of claim 9, wherein determining the minimal one of the NMR measurements comprises determining which of the NMR measurements has a smallest value for at least one of a peak amplitude, integrated value, or a combination thereof.

11. The method of claim 1, wherein obtaining the NMR measurements comprises obtaining RCP pulse based NMR measurements a predefined number of times.

12. One or more non-transitory machine-readable media comprising program code executable by a device to perform operations comprising:
    obtaining a plurality of transverse magnetization measurements corresponding to reverse circularly polarized (RCP) pulses at different orientations of a first and second antenna coils; and
    adjusting orientation of at least one of the first and second antenna coils based, at least in part, on the plurality of transverse magnetization measurements to reduce an imperfection angle between the first and the second antenna coils.

13. The non-transitory machine-readable media of claim 12, wherein adjusting orientation comprises adjusting to each of the different orientations until the corresponding one of the plurality of transverse magnetization measurements satisfies a threshold corresponding to a minimized transverse magnetization measurement.

14. The non-transitory machine-readable media of claim 12, wherein obtaining the plurality of transverse magnetization measurements comprises measuring at least one of a field induction decay (FID) signal, a Carr-Purcell-Meiboom-Gill (CPMG) echo train, and a Hahn echo.

15. The non-transitory machine-readable media of claim 12, wherein the operations further comprise:
controlling the first and second antenna coils to generate RCP pulses at the different orientations; and
determining a minimal one of the plurality of transverse magnetization measurements,
wherein adjusting orientation comprises adjusting orientation of at least one of the first and second antenna coils to the one of the different orientations corresponding to the minimal one of the plurality of transverse magnetization measurements.

16. The non-transitory machine-readable media of claim 15, wherein determining the minimal one of the plurality of transverse magnetization measurements comprises determining which of the plurality of transverse magnetization measurements has a smallest value for at least one of a peak amplitude, integrated value, or a combination thereof.

17. The non-transitory machine-readable media of claim 15, wherein the different orientations are predefined.

18. The non-transitory machine-readable media of claim 15, wherein controlling the first and second antenna coils to generate RCP pulses at the different orientations repeats until the determined minimal one of the plurality of transverse magnetization measurements satisfies a defined threshold.

19. A nuclear magnetic resonance logging tool comprising:
a first antenna coil and a second antenna coil;
a set of one or more actuators coupled to orient at least one of the first and the second antenna coils;
a processor; and
a machine-readable medium having program code executable by the processor to cause the nuclear magnetic resonance logging tool to,
obtain a plurality of transverse magnetization measurements corresponding to reverse circularly polarized (RCP) pulses at different orientations of the first and second antenna coils; and
control the set of one or more actuators to orient at least one of the first and second antenna coils based, at least in part, on the plurality of transverse magnetization measurements to reduce an imperfection angle between the first and the second antenna coils.

20. The nuclear magnetic resonance logging tool of claim 19, wherein program code is executable by the processor to cause the nuclear magnetic resonance logging tool to determine a minimal one of the plurality of transverse magnetization measurements, wherein the program code to control the set of one or more actuators to orient at least one of the first and second antenna coils comprises program code to control the set of one or more actuators to orient to the one of the different orientations corresponding to the minimal one of the plurality of transverse magnetization measurements.

* * * * *